(12) United States Patent
Sasahara

(10) Patent No.: US 9,291,888 B2
(45) Date of Patent: Mar. 22, 2016

(54) LINEAR FRESNEL LENS SHEET, TRANSMISSIVE DISPLAY DEVICE AND ROLL-SHAPED MOLD FOR PRODUCING LINEAR FRESNEL LENS SHEET

(71) Applicant: DAI NIPPON PRINTING CO., LTD., Tokyo (JP)

(72) Inventor: Kazuhiro Sasahara, Tokyo (JP)

(73) Assignee: Dai Nippon Printing Co., Ltd., Shinjuku-Ku (JP)

(*) Notice: Subject to any disclaimer, the term of this patent is extended or adjusted under 35 U.S.C. 154(b) by 0 days.

(21) Appl. No.: 14/539,195

(22) Filed: Nov. 12, 2014

(65) Prior Publication Data
US 2015/0124315 A1    May 7, 2015

Related U.S. Application Data

(63) Continuation of application No. PCT/JP2013/083470, filed on Dec. 13, 2013.

(30) Foreign Application Priority Data

Sep. 25, 2013  (JP) ................................. 2013-198856
Sep. 30, 2013  (JP) ................................. 2013-205456

(51) Int. Cl.
*G03B 21/625* (2014.01)
*G02B 3/08* (2006.01)
*G02B 5/02* (2006.01)
*B29D 11/00* (2006.01)
(Continued)

(52) U.S. Cl.
CPC ........ *G03B 21/625* (2013.01); *B29D 11/00269* (2013.01); *B29D 11/00288* (2013.01); *G02B 3/005* (2013.01); *G02B 3/06* (2013.01); *G02B 3/08* (2013.01); *G02B 5/0236* (2013.01); *G02B 5/0242* (2013.01); *B29C 59/046* (2013.01); *B29C 2035/0827* (2013.01)

(58) Field of Classification Search
CPC ............................... G03B 21/625; G02B 3/08
USPC .......................................... 359/457, 460, 742
See application file for complete search history.

(56) References Cited

U.S. PATENT DOCUMENTS 4,859,043 A * 8/1989 Carel et al. .................... 359/742
5,206,761 A    4/1993 Ogino
(Continued)

FOREIGN PATENT DOCUMENTS

JP    02-043530 A1    2/1990
JP    04-296841 A1   10/1992
(Continued)

OTHER PUBLICATIONS

Japanese Decision of Rejection (with English translation) (Application No. 2012-234714) mailed Aug. 15, 2014.
(Continued)

*Primary Examiner* — Christopher Mahoney
(74) *Attorney, Agent, or Firm* — Burr & Brown, PLLC

(57) ABSTRACT

A linear Fresnel lens sheet (3) includes: a lens layer (10) having a first surface (11) in which a linear Fresnel lens portion (13), having a number of lens surfaces (14) arranged in a first direction d1, is formed, and a second surface (12) opposite the first surface (11); and a diffusion layer (20) disposed on the side of the second surface (12) of the lens layer (10).

10 Claims, 14 Drawing Sheets

(51) Int. Cl.
   *G02B 3/00* (2006.01)
   *G02B 3/06* (2006.01)
   *B29C 59/04* (2006.01)
   *B29C 35/08* (2006.01)

(56) References Cited

U.S. PATENT DOCUMENTS

| | | | |
|---|---|---|---|
| 5,477,380 A | | 12/1995 | Watanabe et al. |
| 5,513,201 A * | | 4/1996 | Yamaguchi et al. ............ 372/75 |
| 5,617,163 A | | 4/1997 | Ohtake |
| 6,151,162 A * | | 11/2000 | Van De Ven .................. 359/443 |
| 6,256,145 B1 * | | 7/2001 | Kono et al. ................... 359/457 |
| 6,256,150 B1 * | | 7/2001 | Rosenthal .................... 359/619 |
| 6,480,679 B1 | | 11/2002 | Ishida et al. |
| 6,710,919 B1 * | | 3/2004 | Clausen ........................ 359/453 |

| | | |
|---|---|---|
| 2011/0075108 A1 | 3/2011 | Kojima et al. |
| 2013/0039031 A1 | 2/2013 | Asano et al. |
| 2014/0092471 A1 * | 4/2014 | Sadahiro et al. .............. 359/449 |

FOREIGN PATENT DOCUMENTS

| | | |
|---|---|---|
| JP | 07-181565 A1 | 7/1995 |
| JP | 07-230127 A1 | 8/1995 |
| JP | 07-276371 A1 | 10/1995 |
| JP | 2000-292864 A1 | 10/2000 |
| JP | 2001-117144 A1 | 4/2001 |
| JP | 2011-090280 A1 | 5/2011 |
| JP | 2012-083401 A1 | 4/2012 |
| WO | 2012/060419 A1 | 5/2012 |

OTHER PUBLICATIONS

Japanese Office Action (Application No. 2012-234714) dated Jun. 12, 2014 (with English translation).

* cited by examiner

FIG. 14(a)
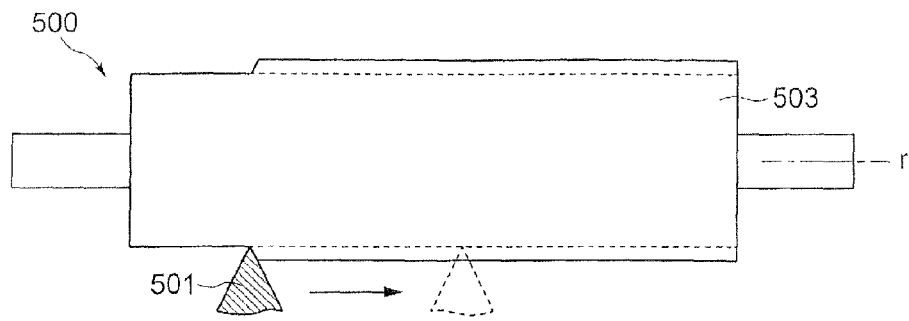
FIG. 14(b)
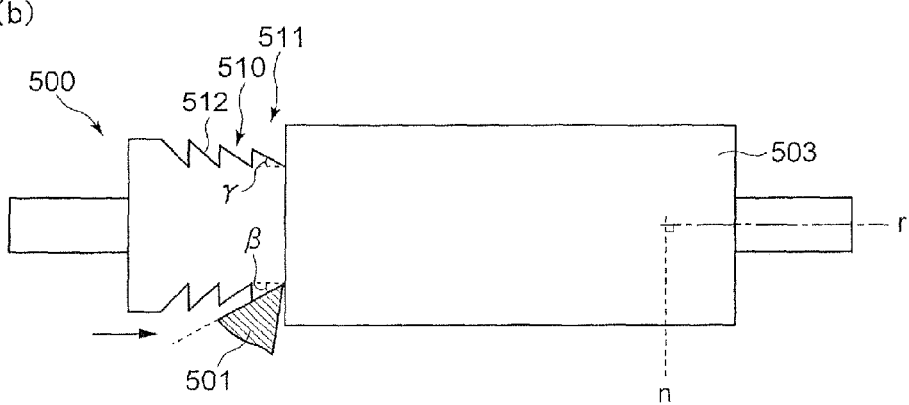
FIG. 14(c)
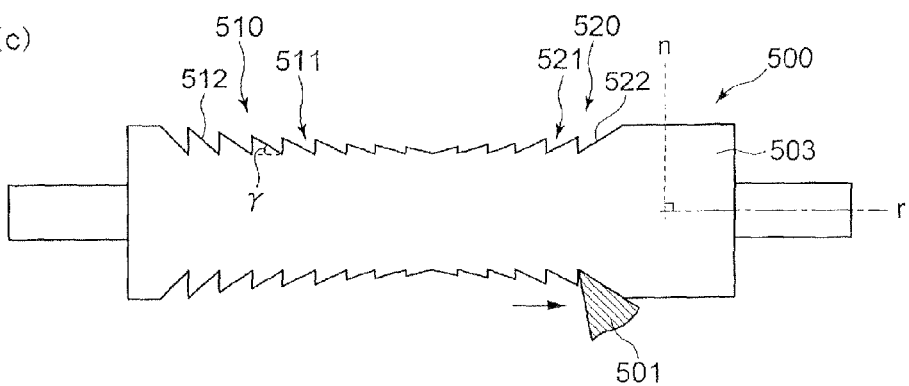
FIG. 14

LINEAR FRESNEL LENS SHEET, TRANSMISSIVE DISPLAY DEVICE AND ROLL-SHAPED MOLD FOR PRODUCING LINEAR FRESNEL LENS SHEET

BACKGROUND OF THE INVENTION

1. Field of the Invention

The present invention relates to a linear Fresnel lens sheet which allows image light, projected from a light source, to exit the light exit-side surface of the sheet, and relates to a transmissive display device provided with the Fresnel lens sheet. The present invention also relates to a roll-shaped mold for producing a linear Fresnel lens sheet.

2. Description of Related Art

A rear-projection image display device uses a transmissive screen for displaying image light that has been enlarged and projected onto the screen from the back. JP 2000-292864A discloses a transmissive screen comprising a linear Fresnel lens sheet for deflecting image light rays, which have been enlarged and projected by a light source, to make them approximately parallel to each other, and a diffusion sheet for diffusing image light that has exited the linear Fresnel lens sheet, thereby increasing the viewing angle.

The linear Fresnel lens sheet has a number of lens surfaces arranged in a certain arrangement direction and, owing to the combination of the lens surfaces, exerts a certain optical effect on incident light. In a typical linear Fresnel lens sheet, the inclination angle of a lens surface with respect to the sheet plane increases with the distance of the lens surface from the middle of the sheet in the arrangement direction of the lens surfaces. Such a linear Fresnel lens sheet is generally produced by a method comprising supplying a UV curable resin between a roll-shaped mold and a substrate which is being fed along the circumference of the roll-shaped mold, and irradiating the resin with ultraviolet light. The use of a roll-shaped mold can produce a linear Fresnel lens sheet with high production efficiency. Further, linear Fresnel lens sheets, produced by such a method, are expected to be used in a variety of applications.

To produce a linear Fresnel lens sheet by the above-described method, it is necessary to prepare a roll-shaped mold. A method for producing a roll-shaped mold will now be described with reference to FIGS. 14 through 16. FIG. 14(a) through 14(c) are schematic views illustrating a method for producing a roll-shaped mold, FIG. 15 is a schematic view illustrating a method for machining a middle portion of the roll-shaped mold, and FIG. 16 is a schematic enlarged view illustrating a middle portion of the machined roll-shaped mold.

First, as shown in FIG. 14(a), a substrate roller 503 made of a metal is prepared, and surface smoothing of the substrate roller 503 is performed with a turning tool 501. Next, as shown in FIG. 14(b), a first annular groove group 510, consisting of a number of first annular grooves 511, is formed sequentially from one end toward the middle of the roll-shaped mold 500 (substrate roller 503) in the axial direction r. Each first annular groove 511 has a first inclined surface 512 for the production of a lens surface. The inclination angle γ of a first inclined surface 512 with respect to the axial direction r increases with the distance of the first inclined surface 512 from the middle of the roll-shaped mold 500 in the axial direction r. Thus, the cutting angle 13 of the turning tool 501 with respect to the axial direction r is made smaller for a first inclined surface 512 than for the adjacent first inclined surface 512 lying farther from the middle of the roll-shaped mold 500 in the axial direction r. In particular, the substrate roller 503 is machined by moving the turning tool 501 in the radial direction n while keeping the cutting edge of the turning tool 501 at a predetermined cutting angle β with respect to the axial direction r, thereby forming a first annular groove 511. The turning tool 501 is then retreated. Next, after moving the turning tool 501 in the axial direction r, the cutting angle 13 of the turning tool 501 is changed to smaller, and machining of the next first annular groove 511 is performed. However, as shown in FIG. 15, if the cutting angle β of the turning tool 501 is made smaller in a middle portion of the substrate roller 503, then the turning tool 501 will make contact with a previously-machined first annular groove 511. Therefore, a first annular groove 511 is formed while maintaining the same cutting angle 13 in the middle portion of the substrate roller 503. Thus, in the middle portion of the substrate roller 503, it becomes physically difficult to perform machining of a first annular groove 511 at a designed cutting angle β; a need arises to perform machining of a first annular groove 511 at a cutting angle which is larger than the designed cutting angle.

After forming the first annular groove group 510, the turning tool 501 is replaced with a new one. Thereafter, as shown in FIG. 14(c), a second annular groove group 520 is formed sequentially from the middle toward the other end of the roll-shaped mold 500 in the axial direction r in the same manner as in the formation of the first annular groove group 510. The second annular groove group 520 consists of a number of second annular grooves 521 each having a second inclined surface 522 for the production of a lens surface.

At the boundary between the first annular groove group 510 and the second annular groove group 520, it is difficult to smoothly connect the first inclined surface 512 of the first annular groove 511 and the second inclined surface 522 of the second annular groove 521 because of a number of factors such as the accuracy of positioning (positioning accuracy upon turning) of the cutting angle 13 of the turning tool 501, the accuracy of mounting of the turning tool 501 upon replacement, the accuracy of feeding of the turning tool 501 by means of a lathe, backlash, etc. Therefore, as shown in FIG. 16, a stepped joint 502 is formed between the first inclined surface 512 and the second inclined surface 522 whose inclination angles with respect to the radial direction n are symmetrical.

FIG. 17 shows a linear Fresnel lens sheet shaped by the use of the roll-shaped mold 500 produced by the above-described method. As shown in FIG. 17, the linear Fresnel lens sheet includes a first lens surface group 410 consisting of a number of first lens surfaces 411 which are inclined toward one side from the normal direction N to the sheet plane of the linear Fresnel lens sheet, and a second lens surface group 420 consisting of a number of second lens surfaces 421 which are inclined toward the opposite side from the normal direction N. As described above, machining is performed in a middle portion of the roll-shaped mold 500 at a cutting angle which is larger than a desired cutting angle. Accordingly, in a middle portion of the linear Fresnel lens sheet, the lens angle α, which is the inclination angle of each lens surface 411 or 421 with respect to the sheet plane of the linear Fresnel lens sheet, is larger than a desired inclination angle. Further, at the boundary between the first lens surface group 410 and the second lens surface group 420, i.e. at the position corresponding to the joint 502 formed between those inclined surfaces of the roll-shaped mold 500 whose inclination angles with respect to the radial direction n are symmetrical, a navel 402 is defined between those lens surfaces 411, 421 whose inclination angles with respect to the normal direction N are symmetrical.

Consider the case where light, mainly comprising parallel light rays, enters the linear Fresnel lens sheet shown in FIG. 17. Light mainly comprising parallel light rays is concentrated into a predetermined light-concentrated area (focus area in the illustrated case) by the lens effect of the linear Fresnel lens sheet. However, because the lens angle α of a lens surface with respect to the sheet plane 1a is larger than a desired inclination angle in a middle portion of the linear Fresnel lens sheet, light entering the middle portion will not be refracted at a desired refraction angle and will not be concentrated into the predetermined light-concentrated area. Therefore, the middle portion of the linear Fresnel lens sheet appears dark to a viewer viewing light that has been concentrated into the light-concentrated area.

Further, in the case where only a transmissive screen exists between the linear Fresnel lens sheet and a viewer, the viewer can view the linear Fresnel lens sheet itself depending on the viewing angle of the viewer. In that case, the navel of the linear Fresnel lens sheet is clearly visible to the viewer. This deteriorates the quality of images displayed on the screen.

Recently attempts have been made to reduce the distance between a light source and a transmissive screen so as to construct a compact rear-projection image display device. However, it has been found through the present inventors' studies that when the distance between a light source and a transmissive screen is short, a stripe pattern, consisting of bright and dark stripes extending in a direction perpendicular to the arrangement direction of lens surfaces, may appear on the transmissive screen when the screen is viewed in a particular direction. FIG. 18 schematically shows a stripe pattern which can appear on the light exit-side surface 602a of a conventional transmissive screen 602. As shown in FIG. 18, the stripe pattern appears in an area S remote from the middle of the light exit-side surface 602a.

SUMMARY OF THE INVENTION

The present invention has been made in view of the above situation. It is therefore a first object of the present invention to obscure a stripe pattern which can appear on the surface of a transmissive screen incorporating a linear Fresnel lens sheet. It is a second object of the present invention to improve and reduce a difference in brightness between a middle portion and the other portion of a linear Fresnel lens sheet, which can be produced depending on the viewing position of a viewer, to an imperceptible level and, in addition, to effectively prevent deterioration in the quality of display images due to a navel as defined between those lens surfaces whose inclination angles with respect to the normal direction are symmetrical.

In order to achieve the first object, the present invention provides a first linear Fresnel lens sheet comprising: a lens layer having a first surface in which a linear Fresnel lens portion, having a number of lens surfaces arranged in a first direction, is formed, and a second surface opposite the first surface; and a diffusion layer disposed on the side of the second surface of the lens layer.

In the first linear Fresnel lens sheet according to the present invention, the degree of internal diffusion of the diffusion layer, which is the degree of diffusion of light by the diffusion layer in the linear Fresnel lens sheet as expressed in terms of a haze value, may be not less than 70%.

In the first linear Fresnel lens sheet according to the present invention, the maximum distance between the linear Fresnel lens portion of the lens layer and the surface of the diffusion layer, lying on the side opposite from the lens layer, may be not more than 1.0 mm.

In the first linear Fresnel lens sheet according to the present invention, the linear Fresnel lens portion may include a first lens surface group consisting of a number of first lens surfaces which are inclined toward one side from the normal direction to the sheet plane of the lens layer, a second lens surface group consisting of a number of second lens surfaces which are inclined toward the opposite side from the normal direction to the sheet plane of the lens layer, and a flat portion provided between the first lens surface group and the second lens surface group in the first direction and including at least one flat surface which extends along the sheet plane of the lens layer.

In the first linear Fresnel lens sheet according to the present invention, the lens layer may include a plurality of the linear Fresnel lens portions formed integrally and each having an optical center.

In the first linear Fresnel lens sheet according to the present invention, the linear Fresnel lens portions may be arranged side by side along the first direction.

The present invention also provides a transmissive display device comprising: any one of the above-described linear Fresnel lens sheets; and a light source having a projection surface for projecting image light onto the diffusion layer of the linear Fresnel lens sheet.

In the transmissive display device according to the present invention, the following relation may be satisfied: $-\alpha1° + \arcsin(1/n)° + \arcsin(1/n \cdot \sin\theta i)° \leq 10°$ where $\alpha1°$ is the angle of the lens surface, lying farthest from the projection surface of the light source, with respect to the sheet plane of the lens layer, n is the refractive index of the lens layer, and $\theta i°$ is the angle formed between the normal direction to the sheet plane of the lens layer and an imaginary line connecting the center of the projection surface of the light source with the center of the lens surface lying farthest from the projection surface of the light source.

In the transmissive display device according to the present invention, the distance between the linear Fresnel lens sheet and the light source may be not more than the length of the linear Fresnel lens portion in the first direction.

In order to achieve the second object, the present invention provides a second linear Fresnel lens sheet comprising a linear Fresnel lens portion having a number of lens surfaces arranged in a first direction, wherein the linear Fresnel lens portion may include a first lens surface group consisting of a number of first lens surfaces which are inclined toward one side from the normal direction to the sheet plane of the linear Fresnel lens sheet, a second lens surface group consisting of a number of second lens surfaces which are inclined toward the opposite side from the normal direction to the sheet plane of the linear Fresnel lens sheet, and a flat portion provided between the first lens surface group and the second lens surface group in the first direction and including at least one flat surface which extends along the sheet plane of the linear Fresnel lens sheet.

In the first or second linear Fresnel lens sheet according to the present invention, the inclination angle of a first lens surface with respect to said sheet plane may be larger than the inclination angle of any other first lens surface, located nearer to the flat portion in the first direction, with respect to said sheet plane; and the inclination angle of a second lens surface with respect to said sheet plane may be larger than the inclination angle of any other second lens surface, located nearer to the flat portion in the first direction, with respect to said sheet plane.

In the first or second linear Fresnel lens sheet according to the present invention, the flat portion may include a plurality of flat surfaces having the same length along said sheet plane.

In the first or second linear Fresnel lens sheet according to the present invention, the flat portion may include a plurality of flat surfaces located at different positions in said normal direction.

In the first or second linear Fresnel lens sheet according to the present invention, the flat surfaces may comprise a first flat surface group consisting of a plurality of first flat surfaces, and a second flat surface group consisting of a plurality of second flat surfaces and lying between the first flat surface group and the second lens surface group; a first flat surface lies in an outer position in said normal direction with respect to any other first flat surface located nearer to the first lens surface group in the first direction; and a second flat surface lies in an outer position in said normal direction with respect to any other second flat surface located nearer to the second lens surface group in the first direction.

In the first or second linear Fresnel lens sheet according to the present invention, the inclination angle of the first lens surface, lying closest to the flat portion in the first direction, with respect to said sheet plane may be not less than 0.01 degrees as a value rounded off to two decimal places; and the inclination angle of the second lens surface, lying closest to the flat portion in the first direction, with respect to said sheet plane may be not less than 0.01 degrees as a value rounded off to two decimal places.

The second linear Fresnel lens sheet according to the present invention may comprise a plurality of the linear Fresnel lens portions formed integrally.

In the second linear Fresnel lens sheet according to the present invention, the linear Fresnel lens portions may be arranged side by side along the first direction.

In the first or second linear Fresnel lens sheet according to the present invention, the linear Fresnel lens portions may have the same length in the first direction.

In the first or second linear Fresnel lens sheet according to the present invention, the linear Fresnel lens portions may have the same construction.

The present invention also provides a roll-shaped mold for producing a linear Fresnel lens sheet, having inclined surfaces, arranged in the axial direction, for producing the lens surfaces of the linear Fresnel lens sheet, said mold comprising: a first annular groove group consisting of a number of first annular grooves arranged in the axial direction, each groove defining a first inclined surface; a second annular groove group consisting of a number of second annular grooves arranged in the axial direction, each groove defining a second inclined surface; and an intermediate portion disposed between the first annular groove group and the second annular groove group, wherein the first inclined surfaces of the first annular groove group are inclined toward one side from the radial direction perpendicular to the axial direction in a cross-section passing through the axis of the roll-shaped mold, and the second inclined surfaces of the second annular groove group are inclined toward the opposite side from the radial direction perpendicular to the axial direction in the cross-section passing through the axis of the roll-shaped mold, and wherein the intermediate portion comprises at least one flat cylindrical portion that defines a cylindrical surface.

The inclination angle of the first inclined surface of a first annular groove with respect to the axial direction may be larger than the inclination angle of the first inclined surface of any other first annular groove, located nearer to the flat cylindrical portion in the axial direction, with respect to the axial direction r; and the inclination angle of the second inclined surface of a second annular groove with respect to the axial direction may be larger than the inclination angle of the second inclined surface of any other second annular groove, located nearer to the flat cylindrical portion in the axial direction r, with respect to the axial direction.

In the roll-shaped mold for producing a linear Fresnel lens sheet according to the present invention, the intermediate portion may comprise a plurality of flat cylindrical portions having the same length along the axial direction.

In the roll-shaped mold for producing a linear Fresnel lens sheet according to the present invention, the intermediate portion may comprise a plurality of flat cylindrical portions that define cylindrical surfaces located at different positions in the radial direction.

In the roll-shaped mold for producing a linear Fresnel lens sheet according to the present invention, the intermediate portion may comprise a first flat cylindrical portion group consisting of a plurality of first flat cylindrical portions, and a second flat cylindrical portion group consisting of a plurality of second flat cylindrical portions and lying between the first flat cylindrical portion group and the second annular groove group; a first flat cylindrical portion defines a cylindrical surface having a larger diameter than that of a cylindrical surface defined by any other first flat cylindrical portion located nearer to the first annular groove group in the axial direction; and a second flat cylindrical portion defines a cylindrical surface having a larger diameter than that of a cylindrical surface defined by any other second flat cylindrical portion located nearer to the second annular groove group in the axial direction.

According to the first linear Fresnel lens sheet of the present invention, it becomes possible to obscure a stripe pattern which can appear on the surface of a transmissive screen incorporating the linear Fresnel lens sheet. According to the second linear Fresnel lens sheet of the present invention, it becomes possible to improve and reduce a difference in brightness between a middle portion and the other portion of the linear Fresnel lens sheet, which can be produced depending on the viewing position of a viewer, to an imperceptible level and, in addition, to effectively prevent deterioration in the quality of display images due to a navel as defined between those lens surfaces whose inclination angles with respect to the normal direction are symmetrical.

BRIEF DESCRIPTION OF THE DRAWINGS

FIG. 14($a$) through 14($c$) are schematic views illustrating a method for producing a conventional roll-shaped mold, FIG. 14($a$) showing the step of performing surface smoothing of the roll-shaped mold, FIG. 14($b$) showing the step of forming a first annular groove group from one end toward the middle of the roll-shaped mold in the axial direction, and FIG. 14($c$) showing the step of forming a second annular groove group from the middle toward the other end of the roll-shaped mold in the axial direction;

DETAILED DESCRIPTION OF THE INVENTION

<First Embodiment>

Figure 1:
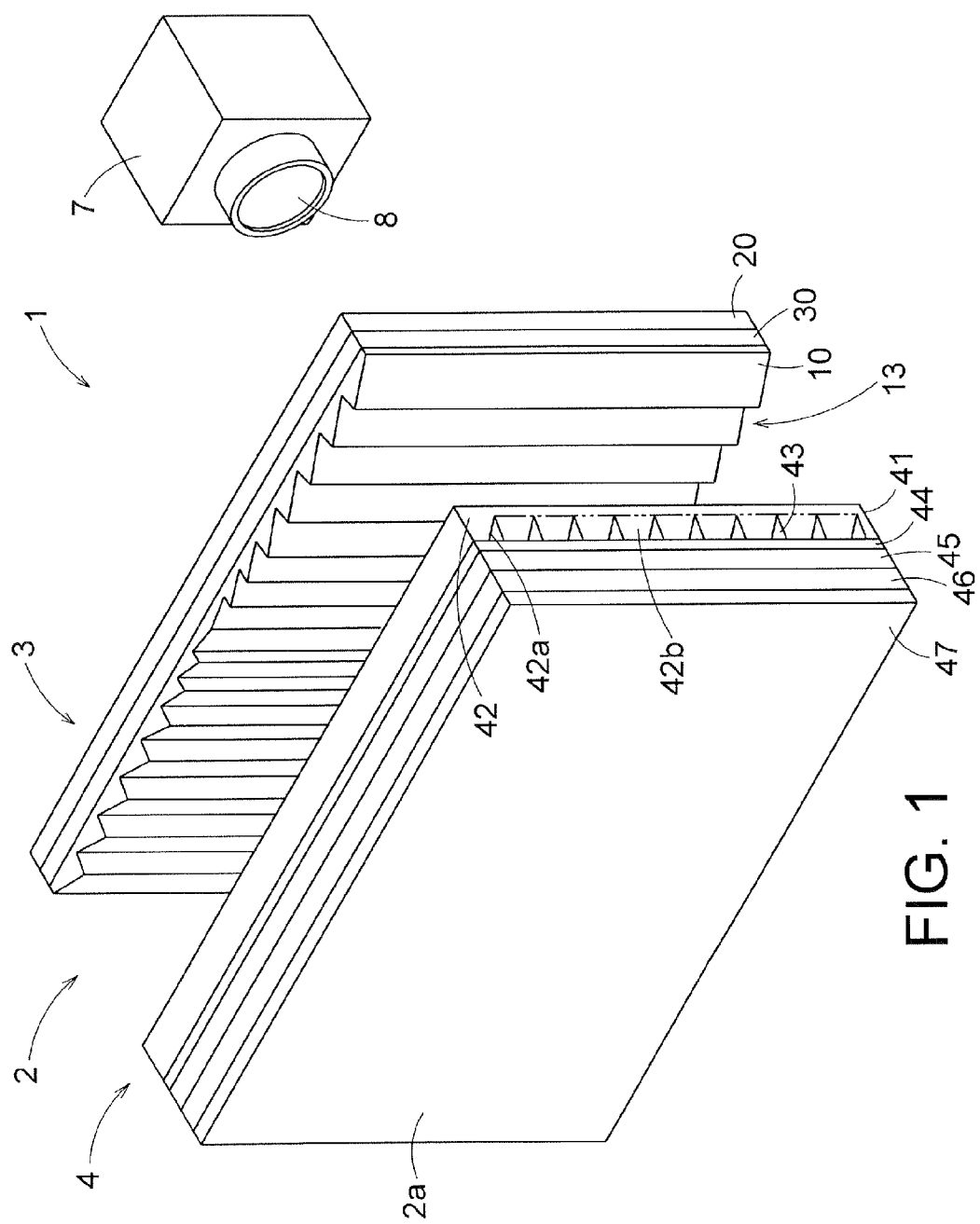
FIG. 1 is a schematic perspective view of a transmissive display device according to a first embodiment of the present invention.
Figure 2:
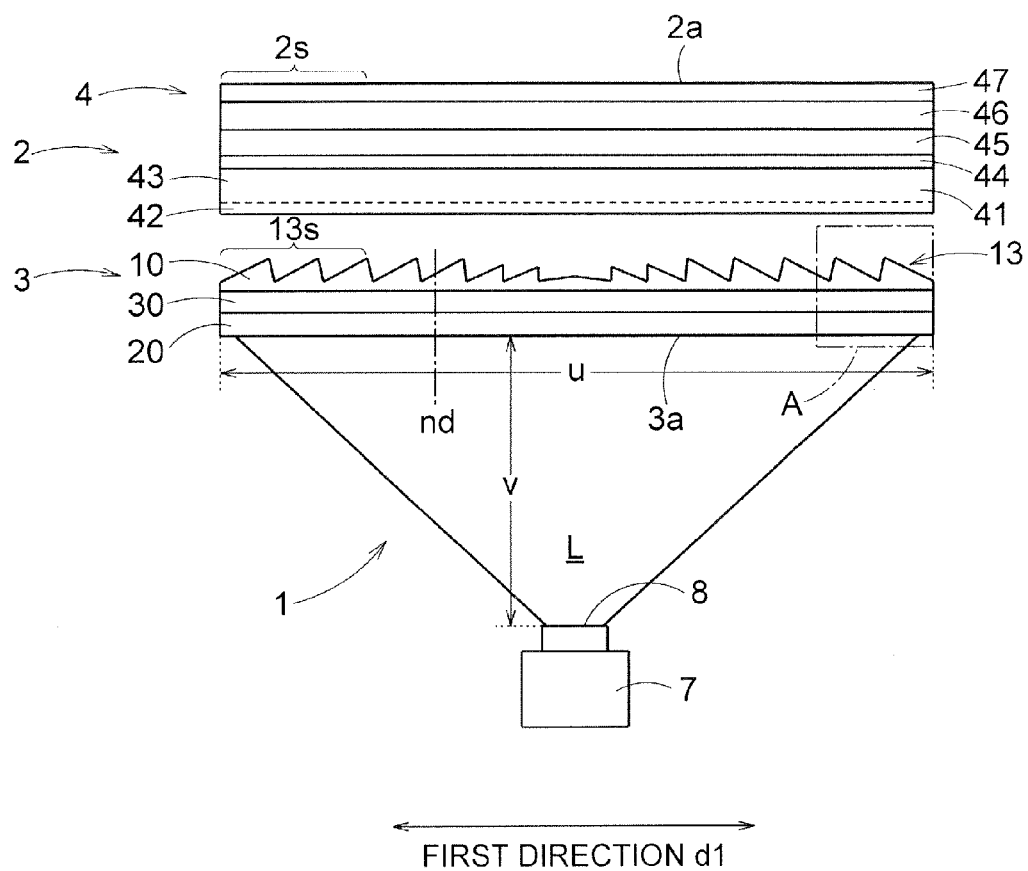
FIG. 2 is a schematic plan view of the transmissive display device shown in FIG. 1.

Preferred embodiments of the present invention will now be described with reference to the drawings. In the drawings attached to the present specification, for the sake of illustration and easier understanding, scales, horizontal to vertical dimensional ratios, etc. are exaggeratingly modified from those of the real things. FIGS. 1 through 6 are diagrams illustrating a linear Fresnel lens sheet according to a first embodiment of the present invention. Of these, FIG. 1 and FIG. 2 are a schematic perspective view and a schematic plan view, respectively, of a transmissive screen including the linear Fresnel lens sheet according to the first embodiment of the present invention.

As shown in FIGS. 1 and 2, the transmissive screen 2 is a device to display image light L, which has been projected from a light source 7, on the viewer side thereof. As shown in FIG. 1, the transmissive screen 2 comprises a linear Fresnel lens sheet 3 for deflecting image light rays L, which have been projected from the projection surface 8 of the light source 7, to make them approximately parallel to each other, and a diffusion sheet 4, disposed on the viewer side of the linear Fresnel lens sheet 3, for diffusing the image light L and allowing the image light L to exit toward a viewer in a wide range. The light exit-side surface of the diffusion sheet 4 constitutes the light exit-side surface 2$a$ of the transmissive screen 2 which allows the image light L to exit toward a viewer. The transmissive screen 2 can be incorporated in a transmissive display device 1.

As shown in FIGS. 1 and 2, the transmissive display device 1 includes the transmissive screen 2 and the light source (image light source) 7 having the projection surface 8 for projecting image light L toward the linear Fresnel lens sheet 3 of the transmissive screen 2. The light source 7 may include an image source such as an LCD or DLP, a lamp for irradiating the image source with light, a projection lens for enlarging and projecting image light emitted by the image source, etc.

In the transmissive display device 1, image light L projected from the projection surface 8 of the light source 7 enters various points on the linear Fresnel lens sheet 3 at various projection angles with respect to the normal direction nd of the lens layer 10 of the linear Fresnel lens sheet 3. The projection angle, i.e. the angle formed between the traveling direction of light that enters the linear Fresnel lens sheet 3 and the normal direction nd, varies depending on the incident position on the linear Fresnel lens sheet 3. The projection angles of light rays, coming from the light source 7 and entering various points on the linear Fresnel lens sheet 3, can be adjusted by appropriately selecting the relative positional relationship, e.g. the distance, between the light source 7 and the linear Fresnel lens sheet 3.

In the transmissive display device 1 of this embodiment, the distance v between the linear Fresnel lens sheet 3 and the light source 7 is set short so as to design the entire apparatus to be compact. Thus, the maximum value of the projection angle, i.e. the angle formed between the traveling direction of light that enters the linear Fresnel lens sheet 3 and the normal direction nd, is set at about 40° to 60° which is significantly larger than conventional values. For example, the distance v between the linear Fresnel lens sheet 3 and the light source 7 may be set not more than the length u of the below-described linear Fresnel lens portion 13 in a first direction d1. Preferably, the distance v between the linear Fresnel lens sheet 3 and the light source 7 is set not more than 65% of the length u of the linear Fresnel lens portion 13 in the first direction d1.

Figure 3:
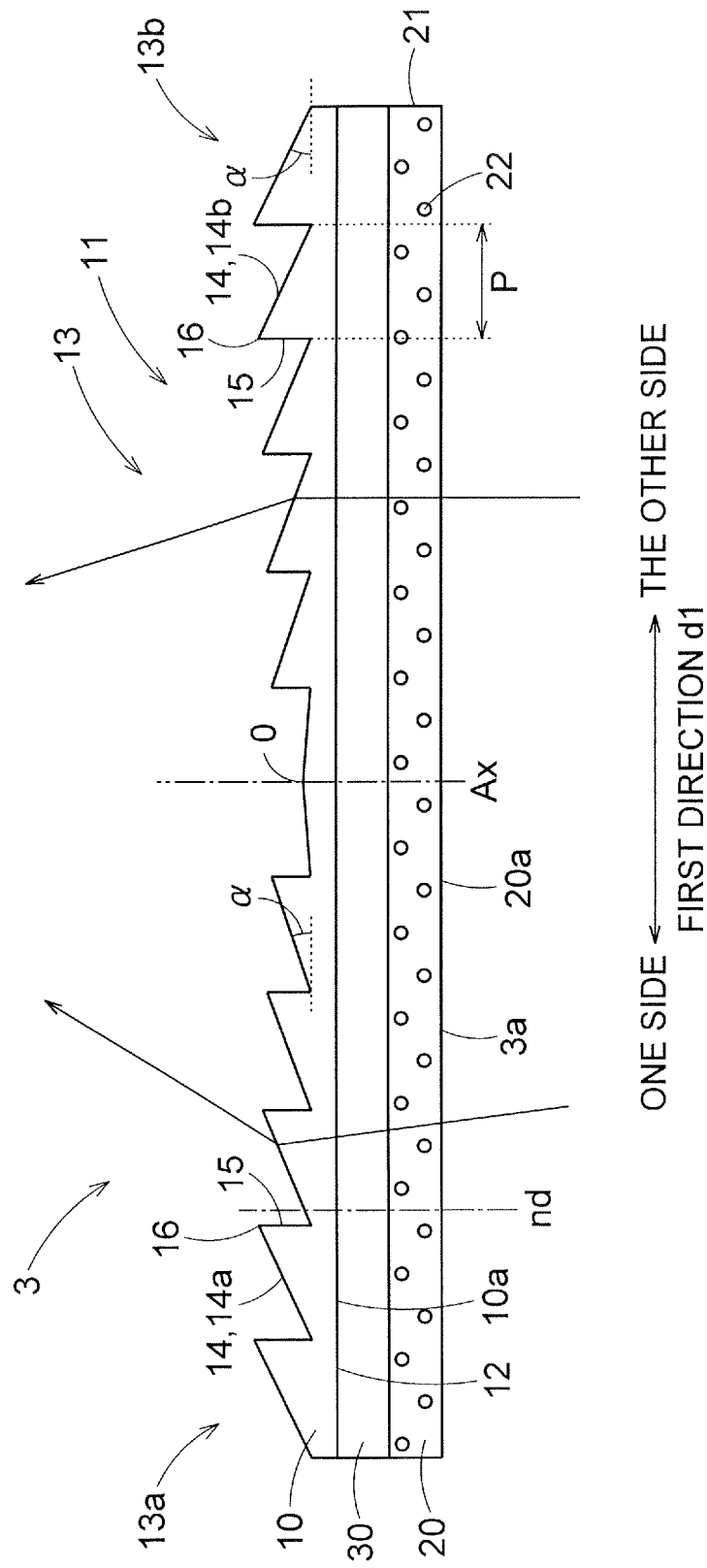
FIG. 3 is an enlarged view of the linear Fresnel lens sheet of the transmissive display device shown in FIG. 1.

The transmissive screen 2 will now be described in detail. As described above, the transmissive screen 2 comprises the linear Fresnel lens sheet 3 and the diffusion sheet 4. The linear Fresnel lens sheet 3 will be first described with reference to FIGS. 1 through 6. FIG. 3 is an enlarged schematic view of the linear Fresnel lens sheet 3 of the transmissive display device 1 shown in FIG. 1.

As shown in FIGS. 1 through 3, the linear Fresnel lens sheet 3 includes a lens layer 10 disposed on the diffusion sheet 4 side, a diffusion layer 20 disposed on the light source 7 side, and a substrate 30 disposed between the lens layer 10 and the diffusion layer 20.

As shown in FIG. 3, the lens layer 10 has a first surface 11 facing the diffusion sheet 4, and a second surface 12 opposite the first surface 11 and facing the light source 7. A linear Fresnel lens portion 13, composed of a so-called linear Fresnel lens, is formed in the first surface 11 of the lens layer 10. The linear Fresnel lens portion 13 has a number of lens surfaces 14 arranged in stripes. Owing to the combination of the number of lens surfaces 14, the linear Fresnel lens portion 13 is expected to exert the same lens effect on incident light as a convex lens.

More specifically, the linear Fresnel lens portion 13 includes a first lens surface group 13a consisting of a number of first lens surfaces 14a which are inclined toward one side from the normal direction nd to the sheet plane 10a of the lens layer 10, and a second lens surface group 13b consisting of a number of second lens surfaces 14b which are inclined toward the opposite side from the normal direction nd. The first lens surface group 13a is disposed on one side of the linear Fresnel lens portion 13 along the first direction d1, while the second lens surface group 13b is disposed on the other side of the linear Fresnel lens portion 13 along the first direction d1. The first lens surfaces 14a and the second lens surfaces 14b constitute the lens surfaces 14 of the linear Fresnel lens sheet 3.

The term "sheet plane (film plane, plate plane)" herein refers to a plane which coincides with the planar direction of an objective sheet-like member when taking a wide and global view of the sheet-like member. In this embodiment the sheet plane of the linear Fresnel lens sheet 3, the sheet plane 10a of the lens layer 10, the sheet plane of the diffusion layer 20 and the sheet plane of the substrate 30 are parallel to each other. In the following description, the second surface 12 of the lens layer 10 is illustrated as the sheet plane 10a of the lens layer 10.

The terms used herein to specify shapes or geometric conditions, such as "parallel", "perpendicular", etc., should not be bound to their strict sense, and should be construed to include equivalents or resemblances from which the same optical function or effect, or such a similar optical effect as indistinguishable in visual determination, can be expected.

The lens surfaces 14 are arranged along the first direction d1 extending in the sheet plane 10a of the lens layer 10. Thus, the first lens surfaces 14a and the second lens surfaces 14b are both arranged along the first direction d1. Each lens surface 14 extends linearly in a direction intersecting the first direction d1, in particular in a direction perpendicular to the first direction d1.

The lens angle α of a lens surface 14, which is the angle of the lens surface 14 with respect to the sheet plane 10a of the lens layer 10, changes in order along the first direction d1. In this embodiment the lens angle α of a lens surface 14 increases with the distance of the lens surface 14 from the middle of the linear Fresnel lens portion 13 in the first direction d1.

An optical center O lies at a position on the boundary between the first lens surface group 13a and the second lens surface group 13b. The optical center O herein refers to an optical center which exerts a lens effect on incident light due to the combination of the lens surfaces 14 constituting the linear Fresnel lens portion 13. In a typical linear Fresnel lens, the optical center O lies on the optical axis Ax of the linear Fresnel lens portion 13. In the illustrated case, the optical center O lies on the boundary between the closest first lens surface 14a to the second lens surface group 13b and the closest second lens surface 14b to the first lens surface group 13a.

A rise surface 15 is provided between two adjacent lens surfaces 14. The length of each rise surface 15 is generally determined by the pitch of the adjacent lens surfaces 14 and the lens angle α of the lens surface 14. As described above, the lens angle α of each lens surface 14 increases with the distance of the lens surface 14 from the middle of the linear Fresnel lens portion 13 in the first direction d1. Accordingly, an outer rise surface 15, lying in an outer position in the first direction d1, has a longer length along the normal direction nd than any inner rise surface 15. No lens effect on light is expected of the rise surfaces 15.

Figure 4:
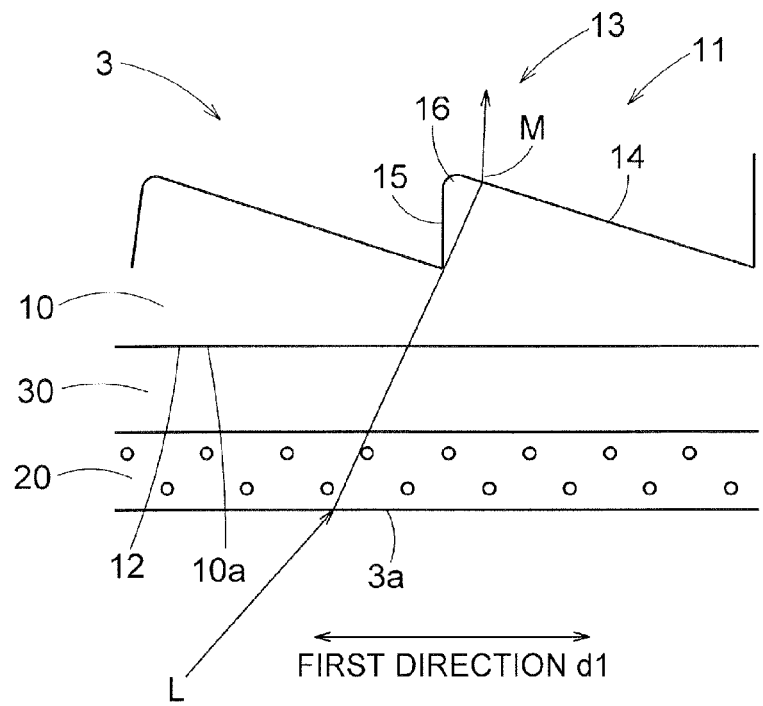
FIG. 4 is an enlarged view of a lens surface of the linear Fresnel lens portion shown in FIG. 3.

A top 16, projecting outward in the normal direction nd, is formed between each lens surface 14 and the rise surface 15. FIG. 4 shows an enlarged view of a top 16 of the linear Fresnel lens portion 13. In this embodiment each top 16 has the shape of a curved surface whose curvature changes smoothly and continuously, or a flat surface approximately parallel to the sheet plane 10a. Each top 16 is formed in a region in which no lens effect on image light L from the light source 7 is expected. In particular, as shown in FIG. 4, image light L from the light source 7 enters the linear Fresnel lens sheet 3 at a certain projection angle and reaches a lens surface 14. Assuming that a light ray passes through an end point on a rise surface 15 with a top 16 formed at one end, the point being farthest from the top 16, and enters a point M on a lens surface 14 with the top 16 formed at one end, no image light L from the light source 7 will enter that region of the linear Fresnel lens portion 13 which lies between the point M and the rise surface 15. Therefore, the provision of the top 16 in the region can effectively prevent blurring of a display image due to the formation of the top 16.

In the illustrated case, the linear Fresnel lens portion 13 is designed to change by refraction the traveling direction of image light L, which has been enlarged and projected by the light source 7, to a direction parallel to the normal direction nd to the sheet plane 10a of the lens layer 10. Further, the optical axis Ax crosses the center of the linear Fresnel lens portion 13. Accordingly, the lens surface 14 lying in the middle of the linear Fresnel lens portion 13 has a minimum lens angle α.

As described above, in the transmissive display device 1 of this embodiment, the distance between the linear Fresnel lens sheet 3 and the light source 7 is set short, and thus the maximum projection angle of light that has been projected from the light source 7 and enters the linear Fresnel lens sheet 3 is set at about 40° to 60° which is significantly larger than conventional values. In such a display device, a stripe pattern, consisting of bright and dark stripes extending in a direction perpendicular to the first direction d1, is likely to appear on the light exit-side surface 2a of the transmissive screen 2 when the screen is viewed in a certain direction.

It has been found through the present inventors' studies that the following is one of the factors that cause a stripe pattern on the light exit-side surface 2a of the transmissive screen 2. The following description is not intended to place limitations on the causes of a stripe pattern. Image light L projected from the light source 7 enters the linear Fresnel lens sheet 3 in a direction at a certain projection angle with respect to the normal direction nd to the sheet plane 10a of the lens layer 10, and travels toward each lens surface 14. The angle of incidence, formed between the traveling direction of light that enters a lens surface 14 and the normal direction N of the lens surface 14, varies with the position of the lens surface 14. In the illustrated case, the angle of incidence to a lens surface 14 increases with the distance of the lens surface 14 from the projection surface 8 of the light source 7.

When the angle of incidence to a lens surface 14 is large, the reflectivity of the lens surface 14 is also large. Accordingly, when the angle of incidence of light to a lens surface 14 is relatively large, a small proportion of the light exits the lens surface 14. As described above, the angle of incidence to a lens surface 14 increases with the distance of the lens surface 14 from the projection surface 8 of the light source 7. Therefore, a relatively low amount of light exits a lens surface 14 lying in a region 13s (see FIG. 2), remote from the light source, of the linear Fresnel lens portion 13, and reaches a region, facing the lens surface 14, of the diffusion sheet 4. It is therefore conceivable that when the transmissive screen 2 is viewed in a certain direction, a region 2s in which a difference in the amount of light can be produced may appear on the light exit-side surface 2a of the transmissive screen 2.

Part of incident light to a lens surface 14, which cannot exit the lens surface 14, reflects from the lens surface 14 and travels inside the linear Fresnel lens sheet 3. Part of the light traveling inside the linear Fresnel lens sheet 3 reflects from the light source-side surface of the linear Fresnel lens sheet 3 and travels toward the linear Fresnel lens portion 13. The present inventors' research has revealed that the light traveling toward the linear Fresnel lens portion 13 mostly reaches a particular region in the region 13s, remote from the light source, of the linear Fresnel lens portion 13. It is conceivable that Light that has exited a lens surface 14 or a rise surface 15, lying in the particular region, is diffused in the diffusion sheet 4, thereby forming bright portions in the region 2s in which a difference in the amount of light can be produced and which may appear on the light exit-side surface 2a of the transmissive screen 2 when the transmissive screen 2 is viewed in a particular direction. It is conceivable that a stripe pattern, consisting of bright and dark stripes extending in a direction perpendicular to the first direction d1, is produced on the light exit-side surface 2a of the transmissive screen 2 by the above mechanism.

Figure 5:
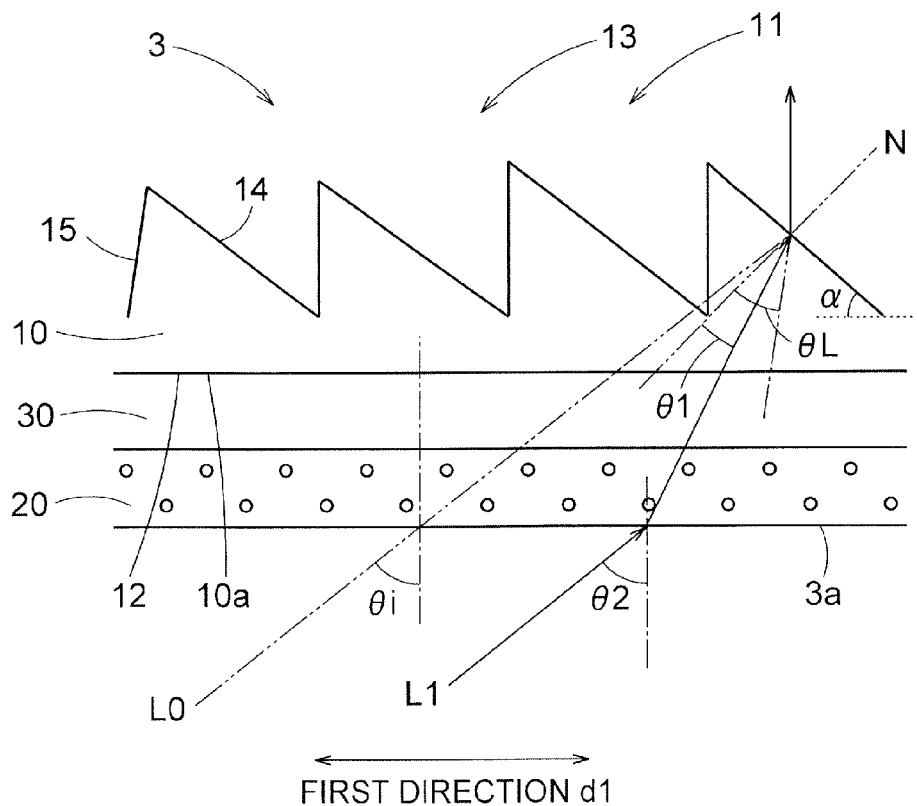
FIG. 5 is a diagram illustrating conditions in which image light from a light source enters a lens surface and which cause a stripe pattern to appear on the light exit-side surface of a transmissive screen.

The present inventors have also made research on the angle of incidence of light that enters a lens surface 14 in case of the formation of a stripe pattern on the light exit-side surface 2a of the transmissive screen 2. The angle of incidence of light that enters a lens surface 14 is largest at a lens surface 14 lying farthest from the projection surface 8. Therefore, the research was focused on the angle of incidence of light that enters the lens surface 14 lying farthest from the projection surface 8. Light to be studied is one that enters the lens surface 14 in a direction inclined outward in the first direction d1 from the normal direction to the lens surface 14, and is deflected inward in the first direction d1 when exiting the lens surface 14. FIG. 5 shows, in an enlarged manner, image light L that enters a lens surface 14 lying farthest from the projection surface 8.

It has been found that a stripe pattern can appear on the light exit-side surface 2a of the transmissive screen 2 when the following relation (1) is satisfied:

$$\theta L° - \theta 1° \leq 10° \tag{1}$$

where θL is the critical angle at the lens surface 14 lying farthest from the projection surface 8, and θ1 is the angle formed between the traveling direction of light that enters the lens surface 14 and the normal direction N of the lens surface 14.

As described above, as the angle of incidence to a lens surface 14 increases, the proportion of light that reflects from the lens surface 14 increases. When the angle of incidence to the lens surface 14 reaches the critical angle θL, the light totally reflects from the lens surface 14. Thus, as the angle of incidence to the lens surface 14 approaches the critical angle θL, the proportion of light that reflects from the lens surface 14 increases. When the relation (1) is satisfied, the angle θ1 of incidence to the lens surface 14 lying farthest from the projection surface 8 is close to the critical angle θL; therefore, a high proportion of light reflects from the lens surface 14, while a low proportion of light exits the lens surface 14. As described above, when the proportion of light that exits the lens surface 14 is low, the amount of light that reaches a region, facing the lens surface 14, of the diffusion sheet 4 is low. It is therefore conceivable that when the transmissive screen 2 is viewed in a particular direction, the region 2s in which a difference in the amount of light can be produced may appear on the light exit-side surface 2a of the transmissive screen 2. On the other hand, when the proportion of light that reflects from the lens surface 14 is high, part of the light that has reflected from the lens surface 14 reflects from the light source-side surface 3a of the linear Fresnel lens sheet 3, and mostly reaches a certain region of the linear Fresnel lens portion 13. It is conceivable that Light that has exited a lens surface 14 or a rise surface 15, lying in the certain region, is diffused in the diffusion sheet 4, thereby forming bright portions in the region 2s in which a difference in the amount of light can be produced and which may appear on the light exit-side surface 2a of the transmissive screen 2 when the transmissive screen 2 is viewed in a particular direction. It is therefore conceivable that when the relation (1) is satisfied, a stripe pattern is produced on the light exit-side surface 2a of the transmissive screen 2.

The critical angle θL can be expressed by the following formula (2):

$$\theta L = \arcsin(1/n) \tag{2}$$

where n is the refractive index of the lens layer 10.

The normal direction N of the lens surface 14 lying farthest from the projection surface 8 is inclined at the lens angle α1 of the lens surface 14 with respect to the normal direction nd to the sheet plane 10a of the lens layer 10, and light L1 that enters the lens surface 14 is inclined at θ1° with respect to the normal direction N of the lens surface 14. Accordingly, the light L1 is inclined at (α1−θ1°) with respect to the normal direction nd to the sheet plane 10a of the lens layer 10. For the projection angle θ2° of the light L1, formed between the normal direction nd of the lens layer 10 and the traveling direction of the light L1 that enters the surface 3a, facing the light source 7, of the linear Fresnel lens sheet 3, the following relation (3) holds based on the Snell's law:

$$\sin\theta 2 = n \cdot \sin(\alpha 1 - \theta 1) \tag{3}$$

θ1 can be determined from the equation (3) as follows:

$$\theta 1 = \alpha 1 - \arcsin(1/n \cdot \sin\theta 2) \tag{4}$$

The light L1 can be regarded as light which is projected from the center of the projection surface 8 and enters the center of the lens surface 14 lying farthest from the projection surface 8. The travel distance of the light L1 in the linear Fresnel lens sheet 3 is negligibly short compared to the travel distance of the light L1 from the light source 7 to the surface 3a of the linear Fresnel lens sheet 3. Therefore, the following equation holds for the angle θi° formed between the normal direction nd to the sheet plane 10a of the lens layer 10 and an imaginary line LO connecting the center of the projection surface 8 with the center of the lens surface 14 lying farthest from the projection surface 8:

$$\theta 2 = \theta i \tag{5}$$

By substituting the equations (2), (4) and (5) into the equation (1), the following relation (6) is obtained:

$$\alpha 1° + \arcsin(1/n)° + \arcsin(1/n \cdot \sin\theta i)° \leq 10° \tag{6}$$

As described above, the relational expression (6) indicates conditions for the formation of a stripe pattern on the light exit-side surface 2a of the transmissive screen 2.

Figure 6:
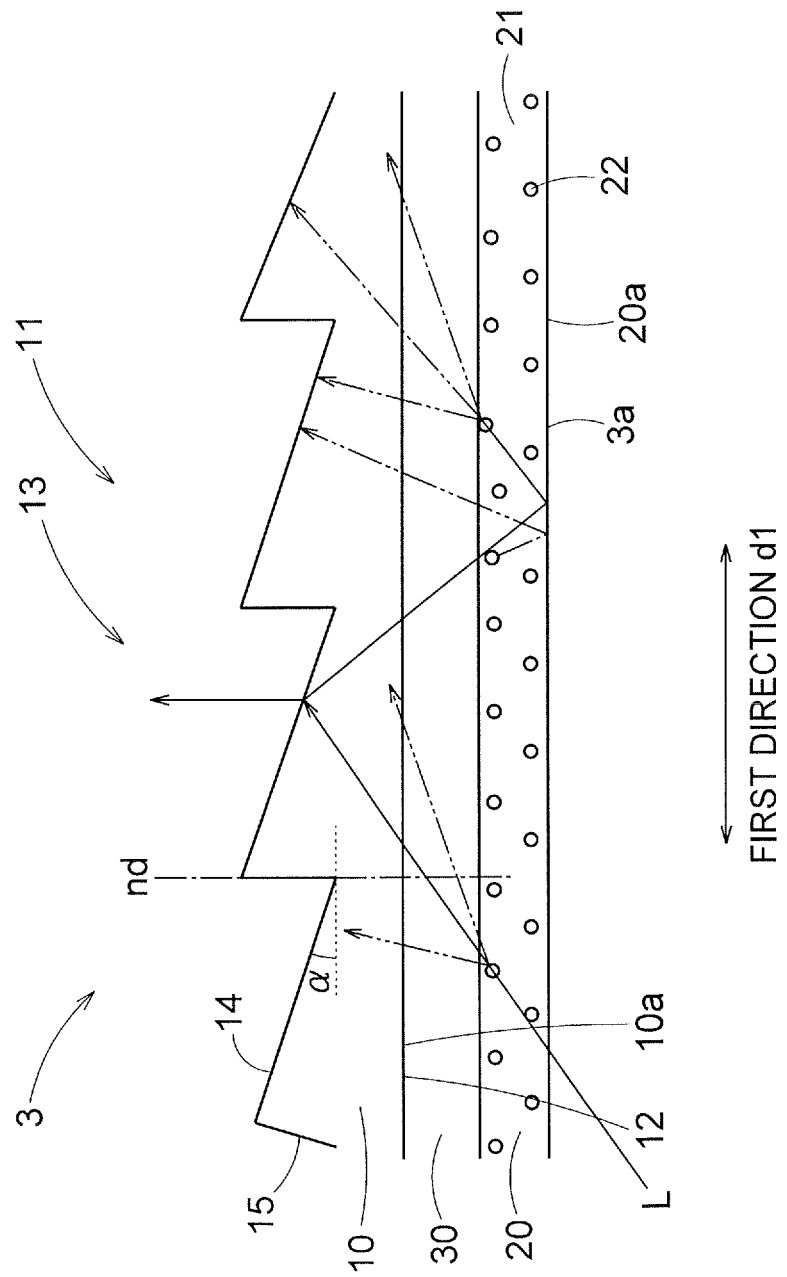
FIG. 6 is an enlarged view of the region A bounded by the dashed-dotted lines shown in FIG. 2.

In this embodiment, in order to obscure a stripe pattern which can appear on the light exit-side surface 2a of the transmissive screen 2, the diffusion layer 20 is disposed on the side of the second surface 12 of the lens layer 10. FIG. 6 illustrates the behavior of image light L from the light source 7 in the diffusion layer 20. As shown in FIG. 6, the image light 7 which has been projected from the light source 7 and entered the linear Fresnel lens sheet 3 is diffused in the diffusion layer 20. The image light L which has been diffused in the diffusion layer 20 is deflected at a lens surface 14 so that the angle of the light with respect to the normal direction nd of the lens layer 10 becomes smaller, and is diffused in the diffusion sheet 4 in various directions.

If image light rays L that have entered the linear Fresnel lens sheet 3 are diffused in the diffusion layer 20 and enter a wide area of the linear Fresnel lens portion 13, then the outline of an image formed by the image light rays L may be blurred. Thus, the quality of display images may be poor. In this embodiment, therefore, the maximum distance between the linear Fresnel lens portion 13 of the lens layer 10 and the surface 20a of the diffusion layer 20, lying on the side opposite from the lens layer 10, is set not more than 1.0 mm. According to such a construction, image light rays L that have entered the linear Fresnel lens sheet 3 and have been diffused in the diffusion layer 20 can enter the linear Fresnel lens portion 13 mainly in a limited area. Thus, even though light that has entered the linear Fresnel lens sheet 3 is diffused in the diffusion layer 20, the light can be prevented from reaching a lens surface 14 lying in a position remote from the incident position to the linear Fresnel lens sheet 3 along the sheet plane 10a of the lens layer 10. This can effectively prevent blurring of the outline of an image formed by image light rays L, thus making it possible to effectively prevent deterioration of the quality of display images.

The distance between the linear Fresnel lens portion 13 of the lens layer 10 and the surface 20a of the diffusion layer 20, lying on the side opposite from the lens layer 10, can be adjusted by appropriately setting e.g. the thickness of the substrate 30 or the thickness of the matrix 21 of the diffusion layer 20.

In this embodiment the surface 20a of the diffusion layer 20, lying on the side opposite from the lens layer 10 and facing the light source 7, defines the light source 7-side surface 3a of the linear Fresnel lens sheet 3. The surface 20a of the diffusion layer 20, facing the light source 7, forms an interface having a refractive index different from that of surrounding air. Owing to the interface, light that has been reflected in the linear Fresnel lens portion 13 of the linear Fresnel lens sheet 3 and returned to the diffusion layer 20 can be reflected at a high reflectivity back toward the linear Fresnel lens portion 13. The light that has been reflected from the linear Fresnel lens portion 13 is diffused in the diffusion layer 20 both when the light is traveling toward the interface and when the light is traveling toward the linear Fresnel lens portion 13 after it has reflected from the interface. Thus, light that has been reflected from a lens surface 14 of the linear Fresnel lens portion 13 and returned to the diffusion layer 20 is strongly diffused as compared to light that exits the lens surface 14 without being reflected from the lens surface 14. The light that has been strongly diffused in the diffusion layer 20 reaches a wide area of the linear Fresnel lens portion 13. Thus, the light can be prevented from mostly reaching particular lens surfaces 14. This makes it possible to obscure a stripe pattern, consisting of bright and dark stripes, which can appear on the light exit-side surface of the transmissive screen 2 when the transmissive screen 2 is viewed in a certain direction. A stripe pattern can thus be obscured by allowing light, which undergoes internal reflection in the linear Fresnel lens sheet 3, to be diffused before it reaches the linear Fresnel lens portion 13.

The diffusion layer 20 of this embodiment comprises a matrix 21 and a diffusing component 22 for diffusing light, dispersed in the matrix 21. The diffusing component 22 herein refers to a component which can exert an optical action, such as refraction or reflection, on light traveling in the diffusion layer 20 to change the traveling direction of the light. Such a light diffusing effect (light scattering effect) of the diffusing component 22 can be produced by using, as the diffusing component 22, a material having a different refractive index from that of the matrix 21, or a material which can exert a reflective effect on light. The diffusing component 22 having a different refractive index from that of the matrix 21 may be exemplified by resin beads, glass beads, a metal compound or a porous material containing a gas, or air bubbles.

Due to the diffusing component 22 dispersed in the matrix 21, the diffusion layer 20 can perform a light diffusing function. The degree of the diffusing effect of the diffusion layer 20 can be adjusted in a very wide range by appropriately adjusting the resin material of the matrix 21, the thickness of the matrix 21, the structure of the diffusing component 22, the concentration of the diffusing component 22, etc. The degree of the diffusing effect of the diffusion layer 20, which may be adjusted in a wide range, can be expressed in terms of the degree of internal diffusion of the diffusion layer 20 in the linear Fresnel lens sheet 3. The "degree of internal diffusion of the diffusion layer 20 in the linear Fresnel lens sheet 3" indicates the degree of diffusion of light by the diffusion layer 20 as incorporated in the linear Fresnel lens sheet 3. In particular, the degree of internal diffusion indicates the degree of diffusion of light by the diffusion layer 20, determined in consideration of the diffusion of light within the diffusion layer 20, the diffusion of light at the interface between the diffusion layer 20 and a layer adjacent to the light entrance side of the diffusion layer 20, and the diffusion of light at the interface between the diffusion layer 20 and a layer adjacent to the light exit side of the diffusion layer 20. A haze value, measured in accordance with JIS K7361-1, is used as an index of the degree of light diffusion. Thus, the total sum of the degree of light diffusion within the diffusion layer 20, the degree of light diffusion at the interface between the diffusion layer 20 and a layer adjacent to the light entrance side of the diffusion layer 20, and the degree of light diffusion at the interface between the diffusion layer 20 and a layer adjacent to the light exit side of the diffusion layer 20, is expressed in terms of a haze value measured in accordance with JIS K7361-1.

A method for measuring the degree of internal diffusion of the diffusion layer 20 in the illustrated linear Fresnel lens sheet 3 will now be described. In the linear Fresnel lens sheet 3 of this embodiment, the lens surfaces 14 of the lens layer 10 also function to change the traveling direction of light. Further, the diffusion layer 20 provides the light entrance-side (light source 7-side) surface of the linear Fresnel lens sheet 3, which forms an interface between it and surrounding air. In this case, in determining the degree of internal diffusion of the diffusion layer 20, a sample which can neglect the diffusion of light by the lens surfaces 14 of the lens layer 10 is produced, and the haze value of the sample is measured in accordance with JIS K7361-1. In particular, the smaller the lens angle α of a lens surface 14 is, the less is the lens effect of changing the traveling direction of light traveling in the normal direction nd to the sheet plane 10a of the lens layer 10. Therefore, it is possible to remove a region, containing a lens surface 14 having the smallest lens angle α, from the linear Fresnel lens sheet 3, and use it as a sample for haze value measurement.

Alternatively, as a sample for haze value measurement can be used a sample produced by flattening (filling) the surface irregularities on the light exit side of the linear Fresnel lens sheet 3, formed by the lens surfaces 14 of the lens layer 10, with a material having the same refractive index as that of the material of the lens layer 10.

It has been found through the present inventors' studies that the degree of internal diffusion of the diffusion layer 20 in the linear Fresnel lens sheet 3 is preferably not less than 70%. In this case, a stripe pattern consisting of bright and dark stripes, which can appear on the light exit-side surface 2a of the transmissive screen 2, can be obscured to an imperceptible level at any viewing angle.

In another embodiment of the diffusion layer 20, the light source 7-side surface 3a of the linear Fresnel lens sheet 3 may have fine irregularities formed e.g. by embossing. In yet another embodiment of the diffusion layer 20, the light source 7-side surface 3a of the linear Fresnel lens sheet 3 may have fine lens-shaped structures.

An acrylic resin, such as a urethane acrylate resin or an epoxy acrylate resin, may be preferably used as a resin material for the lens layer 10 constituting the linear Fresnel lens sheet 3. The refractive index of the resin material for the lens layer 10 is adjusted e.g. to about 1.55 to 1.65. On the other hand, a resin film, such as a PET film, an acrylic resin film or a polycarbonate film, may be used as the substrate 30. The substrate 30 is selected depending on the method for shaping the linear Fresnel lens portion 13, and may not necessarily be provided.

The diffusion sheet 4 which, together with the linear Fresnel lens sheet 3, constitutes the transmissive screen 2 will now be described with reference to FIGS. 1 and 2. As shown in FIGS. 1 and 2, the diffusion sheet 4 comprises a laminate of a light control layer 41, an adhesive layer 44, a light exit-side diffusion layer 45, a substrate 46 and a hard coating layer 47, disposed in this order from the light entrance side to the light exit side.

The light control layer 41, which is disposed nearest to the linear Fresnel lens sheet 3, functions to absorb external light that has entered the diffusion sheet 4, thereby enhancing the contrast of the screen. In addition, the light control layer 41 of this embodiment diffuses light from the linear Fresnel lens sheet 3, thereby allowing the image light to exit in a wide vertical range. The light control layer 41 comprises a body portion 42 having a plurality of horizontally-extending grooves 42a. The grooves 42a formed in the body portion 42 are arranged in the vertical direction. Each groove 42a is tapered with distance from the substrate 46 in the thickness direction of the light control layer 41. The grooves 42a of the body portion 42 are filled with unit optical elements 43 of a resin material. Each unit optical element 43 forms an interface having a refractive index different from that of the body portion 42. At least part of image light L that has exited the linear Fresnel lens sheet 3 and entered the light control layer 41 of the diffusion sheet 4 is reflected from the interface so that the image light L can be diffused before it exits the light exit-side surface 2a of the hard coating layer 47.

A light transmissive region 42b is defined between two adjacent grooves 42a formed in the body portion 42. Thus, the grooves 42a and the light transmissive regions 42b are arranged alternately in the vertical direction in the body portion 42. Light that passes through the light transmissive regions 42b includes light that directly travels into the adhesive layer 44 without entering a groove 42a, and light that travels into the adhesive layer 44 after entering a groove 42a and reflecting from the interface between the unit optical element 43 and the body portion 42. The light guide layer 41 can thus reflect and diffuse image light L at the interfaces between the unit optical elements 43 and the body portion 42, thereby allowing the image light L to exit in a wide vertical range.

The unit optical elements 43 of this embodiment contain light absorbing particles, and can therefore effectively absorb external light that has entered the transmissive screen 2. The light guide layer 41 can thus enhance the contrast of images displayed on the transmissive screen 2.

The light guide layer 41 is not limited to the above-described construction, and may have any other appropriate construction that can absorb external light which has entered the diffusion sheet 4, thereby enhancing the contrast of the screen. For example, the light guide layer 41 may include a plurality of lenticular lenses arranged in a particular direction. In particular, a plurality of lenticular lenses, each extending in a horizontal direction, may be arranged vertically. Such a light guide layer 41 can absorb external light which has entered the diffusion sheet 4, thereby enhancing the contrast of the screen and, in addition, can vertically diffuse image light from the linear Fresnel lens sheet 3, thereby allowing the image light to exit in a wide vertical range. Alternatively, when emphasis is placed on the horizontal viewing angle, a plurality of lenticular lenses, each extending in the vertical direction, may be arranged horizontally. Such a light guide layer 41 can absorb external light which has entered the diffusion sheet 4, thereby enhancing the contrast of the screen and, in addition, can horizontally diffuse image light from the linear Fresnel lens sheet 3, thereby allowing the image light to exit in a wide horizontal range.

The adhesive layer 44 is disposed adjacent to the light guide layer 41 and to the light exit-side diffusion layer 45, and bonds the light guide layer 41 and the light exit-side diffusion layer 45 together. The light exit-side diffusion layer 45 is provided to diffuse image light L from the linear Fresnel lens sheet 3 and allow the image light L to exit toward a viewer in a wide range. The hard coating layer 47 is provided to protect the display surface of the diffusion sheet 4 on which an image is displayed by image light L. The respective components of the diffusion sheet 4 may be those which are per se known in the art of transmissive screens, and therefore a detailed description thereof is omitted.

The operation of the transmissive display device 1 of this embodiment will now be described with reference to the drawings.

As shown in FIG. 2, image light L emitted from the light source 7 enters the diffusion layer 20 of the linear Fresnel lens sheet 3. The image light L that has entered the diffusion layer 20 is diffused in the diffusion layer 20 and travels toward the linear Fresnel lens portion 13. The image light L that has reached the linear Fresnel lens portion 13 is deflected at a lens surface 14 so that the direction of the image light L becomes parallel to the normal direction nd to the lens surface 10a of the lens layer 10. Because the distance between the linear Fresnel lens sheet 3 and the light source 7 is set short in this embodiment, the angle of incidence of light is large when the light enters a lens surface 14 lying remote from the light source 7 in the first direction d1. Thus, the reflectivity of the lens surface 14 is also large, and therefore a certain proportion of the light is reflected from the lens surface 14.

Light that reflects from a lens surface 14 and thus cannot exit the lens surface 14 travels in the linear Fresnel lens sheet 3. Part of the light traveling in the linear Fresnel lens sheet 3 reflects from the light source-side surface 3a of the linear Fresnel lens sheet 3, and is returned toward the linear Fresnel lens portion 13. The light that has been reflected from the linear Fresnel lens portion 13 is diffused in the diffusion layer 20 both when the light is traveling toward the light source-side surface 3a and when the light is traveling toward the linear Fresnel lens portion 13 after it has reflected from the surface 3a. The light is thus strongly diffused in the diffusion layer 20, and exits the linear Fresnel lens portion 13 in a wide area in the region 13s (see FIG. 2) lying remote from the light source 7. It therefore becomes possible to allow light to effectively exit the region 13s, lying remote from the light source 7, of the linear Fresnel lens portion 13, and travel toward the diffusion sheet 4 facing the region 13s.

Image light L that has exited a lens surface 14 enters the diffusion sheet 4. The image light L that has entered the diffusion sheet 4 is diffused in the diffusion sheet 4 before exiting it. In particular, image light L that has been deflected into a direction approximately parallel to the normal direction nd of the lens layer 10 is effectively diffused in the diffusion sheet 4 so that the light travels in various directions. Thus, it becomes possible to allow image light L to exit toward a viewer in a wide range.

As described hereinabove, the transmissive screen 2 of this embodiment comprises: the lens layer 10 having the first surface 11, in which the linear Fresnel lens portion 13 is formed, and the second surface 12 opposite the first surface 11; and the diffusion layer 20 disposed on the side of the second surface 12 of the lens layer 10. According to the transmissive display device 1 of this embodiment, image light L which has been projected from the light source 7 and has entered the linear Fresnel lens sheet 3 is diffused in the diffusion layer 20 before it reaches the linear Fresnel lens portion 13. Part of the image light L reflects from a lens surface 14 and travels toward the light source-side surface 3a of the linear Fresnel lens sheet 3. Part of the light then reflects from the light source-side surface 3a, and is returned toward the linear Fresnel lens portion 13. The light that has been reflected from the linear Fresnel lens portion 13 is thus diffused in the diffusion layer 20 both when the light is traveling toward the light source-side surface 3a and when the light is traveling toward the linear Fresnel lens portion 13 after it has reflected from the surface 3a. The light is thus strongly diffused in the diffusion layer 20, and reaches a wide area of the linear Fresnel lens portion 13. Thus, the light can be prevented from mostly reaching particular lens surfaces 14. This makes it possible to obscure a stripe pattern, consisting of bright and dark stripes, which may appear on the light exit-side surface of the transmissive screen 2 when the transmissive screen 2 is viewed in a particular direction.

As described above, the transmissive display device 1 of this embodiment satisfies the following relation:

$$-\alpha 1°+\arcsin(1/n)°+\arcsin(1/n \cdot \sin \theta i)° \leq 10° \quad (6)$$

The distance v between the linear Fresnel lens sheet 3 and the light source 7 is short when the relation (6) is satisfied. The transmissive display device 1 can therefore be designed to be compact. In addition, when the relation (6) is satisfied, light from the projection surface 8 of the light source can be made to directly enter the linear Fresnel lens sheet 3 without using a deflecting means such as a mirror. The transmissive display device 1 can therefore be produced at a low cost with a simple mechanism.

There is fear that due to vibration that may occur during transportation of the transmissive screen 2, the tops 16 of the linear Fresnel lens portion 13 of the linear Fresnel lens sheet 3 can make contact with the diffusion sheet 4. If the tops 16 of the linear Fresnel lens sheet 3 make contact with the diffusion sheet 4, the tops 16 can be crushed under pressure from the diffusion sheet 4 or can scratch the surface of the diffusion sheet 4. In this embodiment each top 16 has the shape of a curved surface whose curvature changes smoothly and continuously, or a flat surface approximately parallel to the sheet plane 10a. This can make the tops 16 of the linear Fresnel lens sheet 3 less crushable under pressure from the diffusion sheet 16, and can reduce the fear of the tops 16 scratching the surface of the diffusion sheet 4. The formation of each top 16 as a flat or curved surface does not require any special packaging upon transportation or special handling upon assembling work, and therefore does not involve a high transportation or assembling cost.

EXAMPLES CONCERNING THE FIRST EMBODIMENT

The following examples illustrate the present invention in greater detail and are not intended to limit the invention in any manner. Linear Fresnel lens sheets of Examples 1 to 3 and Comparative Example 1 were produced in the below-described manner. Transmissive screens, each incorporating one of the linear Fresnel lens sheets, were examined for the appearance of a strip pattern.

The linear Fresnel lens sheets of Examples 1 to 3 have the construction shown in FIG. 3.

Example 1

A UV curable resin was supplied between a substrate film and a roll-shaped mold for shaping of a linear Fresnel lens portion, and then the UV curable resin was cured to prepare an intermediate laminate consisting of the substrate film and a lens layer. A PET film having a thickness of 0.188 mm was used as the substrate film. The UV curable resin for the lens layer had a refractive index of 1.55.

Next, a diffusion layer was bonded to the intermediate laminate. The diffusion layer had a thickness of 0.010 to 0.020 mm and had fine surface irregularities formed by embossing.

Examples 2 and 3

The linear Fresnel lens sheets of Examples 2 and 3 were the same as the linear Fresnel lens sheet of Example 1 except that the degree of the diffusing effect of the diffusion layer differs between them.

In particular, the degree of the diffusing effect of the diffusion layer was made higher in the linear Fresnel lens sheets of Examples 2 and 3 than in the linear Fresnel lens sheet of Example 1 by adjusting the size and the density of the fine surface irregularities.

The lens layer and the substrate of the linear Fresnel lens sheets of Examples 2 and 3 were the same as those of the linear Fresnel lens sheet of Example 1. Thus, the intermediate laminate, consisting of the lens layer 10 and the substrate 30, was the same among the linear Fresnel lens sheets of Examples 1 to 3.

Comparative Example 1

The linear Fresnel lens sheet of Comp. Example 1 was the same as the linear Fresnel lens sheet of Example 1 except for not having the diffusion layer. Thus, the linear Fresnel lens sheet of Comp. Example 1 consists of the same substrate and the same shaped lens layer formed from the UV curable resin. Thus, the linear Fresnel lens sheet of Comp. Example 1 corresponds to the intermediate laminate of Examples 1 to 3.

[Measurement of the Degree of Internal Diffusion of the Diffusion Layer]

For each of the linear Fresnel lens sheets of Examples 1 to 3 and Comp. Example 1, the degree of internal diffusion of the diffusion layer was measured. A region containing a lens surface having the smallest lens angle, which is approximately 0°, was removed from each linear Fresnel lens sheet, and used as a sample for haze value measurement. The samples were subjected to haze value measurement conducted in accordance with JIS K7361-1. The results of the measurement are shown in the column "internal diffusion degree" in Table 1.

[Method for Evaluating a Stripe Pattern and the Evaluation Results]

Transmissive display devices, each comprising a transmissive screen and a light source as shown in FIG. 1, were produced. Each of the linear Fresnel lens sheets of Examples 1 to 3 and Comp. Example 1 was used as the linear Fresnel lens sheet of each transmissive screen. Components incorporated in a commercially-available transmissive display device were used as the components, other than the linear Fresnel lens sheet, of each transmissive display device tested.

Image lights were projected from the light source onto the transmissive screen at varying projection angles, and the light exit-side surface of the transmissive screen was visually checked for the appearance of a stripe pattern on it. More specifically, the relative position between the projection surface of the light source and the linear Fresnel lens sheet was changed in four ways, and the angle θi shown in FIG. 5 was measured in each case. The results of the visual check for a strip pattern on the transmissive screen, using each of the linear Fresnel lens sheets of Examples 1 to 3 and Comp. Example 1, are shown in Table. 1. Further, the calculation values of the left-hand side of the expression (6) are shown in the column "expression (6)" in Table 1. In the expression (6), "α1" is the lens angle of a lens surface lying farthest from the projection surface. In Table 1, the symbol X indicates a sample in which upon projection of image lights from the light source onto the transmissive screen at varying projection angles, a clear stripe pattern appeared on the light exit-side surface of the transmissive screen when observed in a particular direction; and the symbol ⊚ indicates a sample in which no stripe pattern was observed. The symbol ○ indicates a sample in which upon projection of image lights from the light source onto the transmissive screen at varying projection angles, a stripe pattern was found when the light exit-side surface of the transmissive screen was carefully observed in a particular direction, but the stripe pattern was of such a degree as not to cause a problem in normal use of the display device.

TABLE 1

| Angle | | Expression | Ex.1 | Ex.2 | Ex.3 | Comp.1 |
| --- | --- | --- | --- | --- | --- | --- |
| | | | Degree of internal diffusion | | | |
| θi | α1 | (6) | 18.5 | 70 | 80.4 | 2 |
| 56.0 | 69.5 | 3.0 | ○ | ⊚ | ⊚ | X |
| 47.7 | 63.9 | 4.8 | ○ | ⊚ | ⊚ | X |
| 36.5 | 54.0 | 8.7 | ○ | ⊚ | ⊚ | X |
| 19.5 | 33.0 | 19.6 | — | — | — | None |
| 18.4 | 31.3 | 20.6 | — | — | — | None |

As can be seen from the results for Comp. Example 1 in Table 1, the larger the projection angle of image light is, the more a stripe pattern, consisting of bright and dark stripes, is likely to appear on the light exit-side surface of the transmissive screen when the screen is viewed in a particular direction. The data in Table 1 shows that no stripe pattern appears when the value of the left-hand side of the expression (6) is not less than 19.6°, whereas a stripe pattern appears when the value is not more than 8.7°.

In the samples using the linear Fresnel lens sheets of Examples 1 to 3, no clear stripe pattern appeared on the light exit-side surface of the transmissive screen even when the screen was viewed in various directions. In particular, in the samples using the linear Fresnel lens sheets of Examples 2 and 3, no stripe pattern was found on the light exit-side surface of the transmissive screen even when the screen was viewed in various directions. The results thus indicate that a stripe pattern can be prevented from appearing on the exit-side surface of the transmissive screen by adjusting the degree of internal diffusion of the diffusion layer in the linear Fresnel lens sheet to not less than 70%.

<Second Embodiment>

Figure 7:
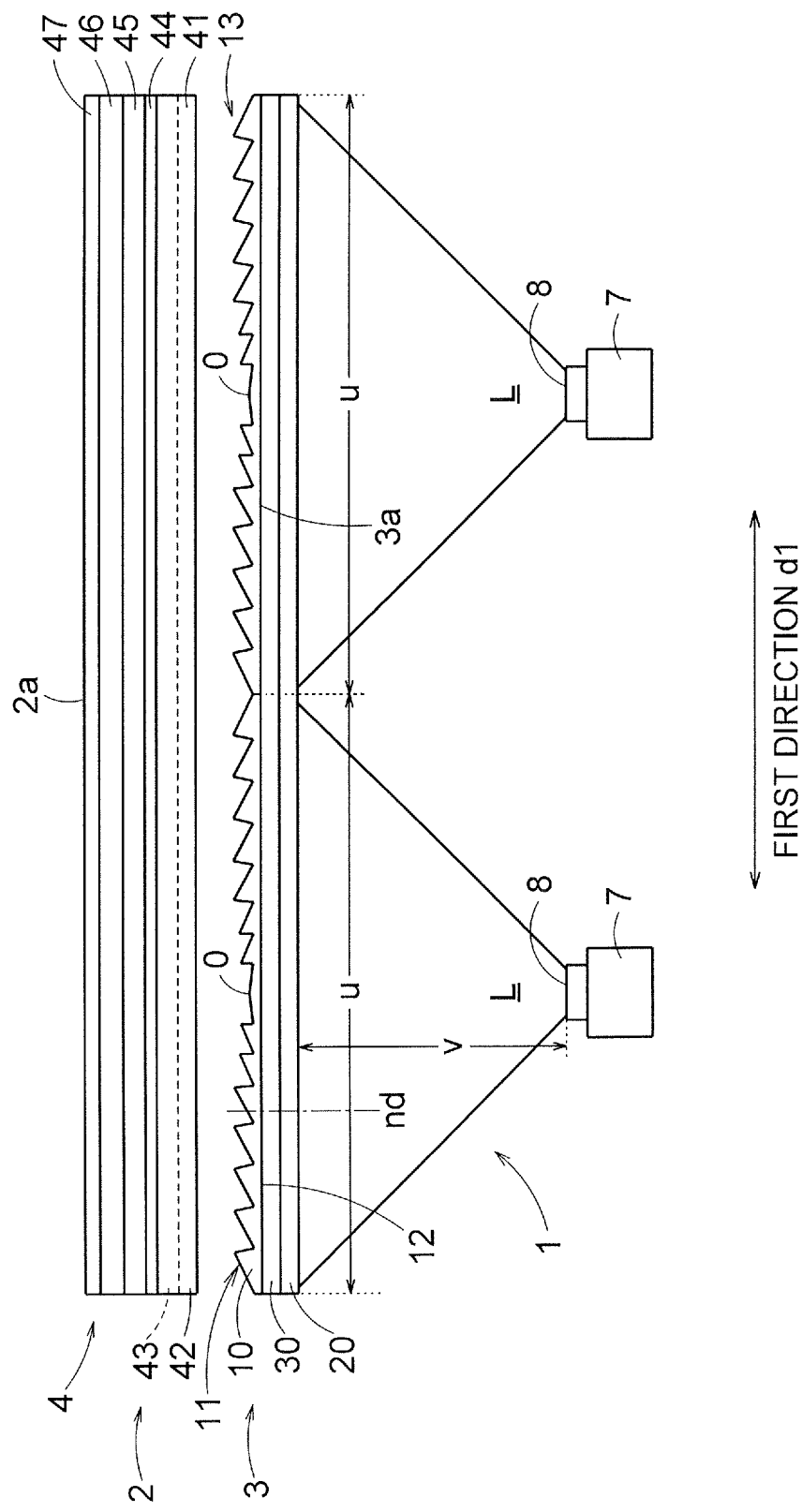
FIG. 7 is a schematic plan view of a transmissive display device according to a second embodiment of the present invention.

A second embodiment of the present invention will now be described with reference to FIG. 7. FIG. 7 is a schematic plan view of a transmissive display device according to the second embodiment of the present invention. The second embodiment illustrated in FIG. 7 differs from the first embodiment in that the linear Fresnel lens sheet 3 includes a plurality of linear Fresnel lens portions 13. The other construction of the second embodiment may be the same as the first embodiment. In the following description and the relevant drawings of the second embodiment, the same reference numerals are used for the same members or elements as used in the above-described first embodiment, and a duplicate description thereof will be omitted.

As shown in FIG. 7, the transmissive display device 1 of this embodiment includes a transmissive screen 2 and a plurality of light sources (image light sources) 7 each having a projection surface 8 for projecting image light L toward the linear Fresnel lens sheet 3 of the transmissive screen 2.

The projection angle of image light L projected from each light source 7 is determined according to a combination with the below-described linear Fresnel lens portion 13. Image lights L from the light sources 7 may display the same or different images. In the case where image lights L display different images, the different images may be combined so that the images as a whole make one display image.

The transmissive screen 2 will now be described in detail. As in the first embodiment, the transmissive screen 2 comprises the linear Fresnel lens sheet 3 and a diffusion sheet 4. The diffusion sheet 4 may be substantially the same as that of the first embodiment.

As shown in FIG. 7, the linear Fresnel lens sheet 3 includes a lens layer 10 disposed on the diffusion sheet 4 side, a diffusion layer 20 disposed on the light source 7 side, and a substrate 30 disposed between the lens layer 10 and the diffusion layer 20. A plurality of linear Fresnel lens portions 13 are formed in the first surface 11 of the lens layer 10. Each linear Fresnel lens portion 13 deflects image light rays L from the corresponding light source 7 to make the image light rays L, exiting the linear Fresnel lens portion 13 toward a viewer, approximately parallel to each other. Each linear Fresnel lens portion 13 has an optical center O. The construction of each linear Fresnel lens portion 13 is substantially the same as the above-described linear Fresnel lens portion 13 of the first embodiment, and therefore a detailed description thereof is omitted.

The linear Fresnel lens portions 13 are formed integrally. Thus, as will be appreciated from the below-described production method, no joint is formed between adjacent linear Fresnel lens portions 13.

In this embodiment the length of the linear Fresnel lens sheet 3 in the first direction d1 is significantly large compared to the distance v between each light source 7 and the linear Fresnel lens sheet 3. In such a case, if image light L is projected from the projection surface of a single light source directly onto a linear Fresnel lens sheet, then the angle of incidence of an image light ray L that enters a lens surface 14 lying remote from the light source in the first direction d1 will be considerably large. Accordingly, the reflectivity at the lens surface 14 is large; therefore, an image formed by image light L appears dark in a region lying remote from the light source in the first direction d1. Thus, in a common rear-projection transmissive image display device 1 which uses a single projection surface of a single light source 7, the length of the transmissive screen 2 in the first direction d1 cannot be made sufficiently long if the distance v between the light source 7 and the linear Fresnel lens sheet 3 is set short. The lens angle α of a lens surface 14 increases with increase in the angle of incidence of image light L to the lens surface 14. If the lens angle α of a lens surface 14 exceeds 70°, it is difficult to machine a roll-shaped mold for shaping of the lens surface 14 under mass-productive machining conditions. Thus, in the case where image light is projected from the projection surface of a single light source 7 directly onto a linear Fresnel lens sheet 3 in a transmissive display device in which the length of the linear Fresnel lens sheet 3 in the first direction d1 is significantly larger than the distance v between the light source 7 and the linear Fresnel lens sheet 3, it is not possible to shape in a mass-productive manner those lens surfaces which lie remote from the light source 7.

In this embodiment, therefore, the plurality of linear Fresnel lens portions 13 are arranged side by side along the first direction d1. Correspondingly, the plurality of light sources 7 are arranged side by side along the first direction d1. According to the transmissive display device 1 having such a construction, the maximum inclination angle of image light L, projected from the projection surface of each light source 7, with respect to the normal direction nd can be reduced as compared to the case where image light is projected from the projection surface of a single light source onto a linear Fresnel lens sheet having a single linear Fresnel lens portion. This can reduce the reflectivity of each lens surface 14 to a low level, thereby effectively preventing an image, formed by image light L, from appearing dark.

In this embodiment the linear Fresnel lens portions 13 have the same length u in the first direction d1. However, the linear Fresnel lens portions 13 may have different lengths u in the first direction d1. In this embodiment the linear Fresnel lens portions 13 have the same shape: the linear Fresnel lens portions 13 have the same size, and the lens surfaces 14 of the linear Fresnel lens portions 13 are arranged in the same manner. However, the linear Fresnel lens portions 13 may have different shapes. Two adjacent linear Fresnel lens portions 13 are arranged with almost no space therebetween. In particular, the gap between two adjacent linear Fresnel lens portions 13 is not more than 2.0 mm, preferably not more than 1.0 mm.

The thus-constructed transmissive display device of this embodiment can achieve substantially the same effects as the above-described transmissive display device of the first embodiment, and therefore a detailed description thereof will be omitted.

As described above, in this embodiment the linear Fresnel lens portions 13 are formed integrally. This enables high-accuracy positioning of the relative position of the linear Fresnel lens portions 13. Further, by positioning the single linear Fresnel lens sheet 3 with respect to the light sources 7, each linear Fresnel lens portion 13 can be positioned with respect to the corresponding light source 7 easily with high accuracy. This makes it possible to smoothly connect images formed by image lights L from adjacent light sources 7.

In the above-described embodiment the transmissive display device 1 includes the plurality of light sources 7 having the projection surfaces 8 for projecting image light L onto the linear Fresnel lens sheet 3; the projection surface 8 of each light source 7 projects image light L onto the corresponding linear Fresnel lens portion 13. However, the present invention is not limited to the use of such light sources 7. The transmissive display device may include a single light source having a plurality of projection surfaces for projecting image light onto the linear Fresnel lens sheet 3. In that case, each projection surface of the single light source projects image light onto the corresponding linear Fresnel lens portion 13. In order to reduce the angle of incidence of image light to a lens surface(s) 14, image light from a projection surface may be allowed to enter the corresponding linear Fresnel lens portion 13 via a deflecting means such as a mirror.

<Third Embodiment>

Figure 8:
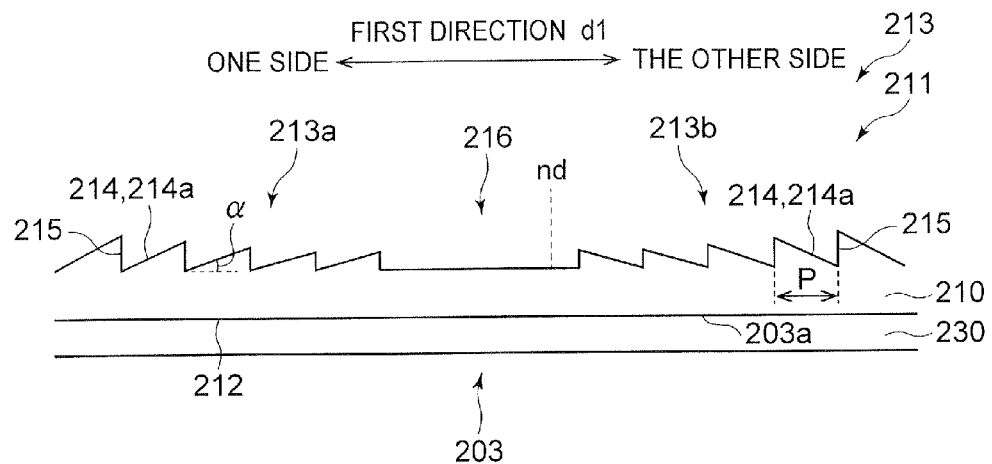
FIG. 8 is a schematic view of a linear Fresnel lens sheet incorporated in a transmissive display device according to a third embodiment of the present invention.

A third embodiment of the present invention will now be described with reference to FIGS. 8 through 14. FIG. 8 is a schematic plan view of a linear Fresnel lens sheet incorporated in a transmissive display device according to a third embodiment of the present invention. The third embodiment illustrated in FIGS. 8 through 14 differs from the first embodiment in that the linear Fresnel lens portion 213 of a linear Fresnel lens sheet 203 has a flat portion 216 between a first lens surface group 213a and a second lens surface group 213b. The other construction of the third embodiment may be the same as the first embodiment. In the following description and the relevant drawings of the third embodiment, the same reference numerals are used for the same members or elements as used in the above-described first embodiment, and a duplicate description thereof will be omitted.

As with the transmissive display device 1 shown in FIG. 1, the transmissive display device of this embodiment includes a transmissive screen and a light source. The transmissive screen includes a linear Fresnel lens sheet 203 and a diffusion sheet. The components, other than the linear Fresnel lens sheet 203, of the transmissive screen may be substantially the same as the above-described components of the first embodiment, and therefore a detailed description thereof will be omitted.

Figure 9:
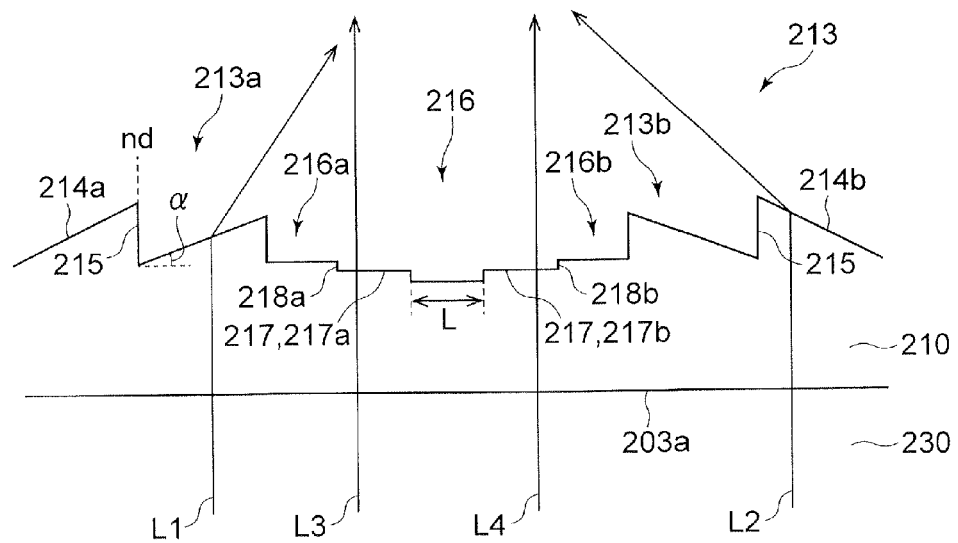
FIG. 9 is a partial enlarged view of the flat portion of the linear Fresnel lens sheet shown in FIG. 8.

The linear Fresnel lens sheet 203 will now be described with reference to FIGS. 8 and 9. FIG. 9 is a partial enlarged view of a middle portion of the linear Fresnel lens sheet 203 shown in FIG. 8. The following description illustrates a case where the linear Fresnel lens sheet 203 is produced by a method using a UV curable resin. However, the linear Fresnel lens sheet 203 may be produced by other methods such as extrusion.

As shown in FIGS. 8 and 9, the linear Fresnel lens sheet 203 includes a substrate 230 and a lens layer 210 disposed on the viewer side of the substrate 230. As is well known in the art of linear Fresnel lens sheet, the lens layer 210 and/or the substrate 230 may contain various additives such as a diffusing agent, or may be subjected to surface treatment such as coating.

As shown in FIGS. 8 and 9, the lens layer 210 has a first surface 211 facing the diffusion sheet 4, and a second surface 212 opposite the first surface 211 and facing the light source 7. A linear Fresnel lens portion 213, composed of a so-called linear Fresnel lens, is formed in the first surface 211 of the lens layer 210. The linear Fresnel lens portion 213 has a number of lens surfaces 214 arranged in stripes. Owing to the combination of the number of lens surfaces 214, the linear Fresnel lens portion 213 is expected to exert the same lens effect on incident light as a convex lens.

More specifically, the linear Fresnel lens portion 213 includes a first lens surface group 213a consisting of a number of first lens surfaces 214a which are inclined toward one side from the normal direction nd to the sheet plane 203a of the linear Fresnel lens sheet 203 (the sheet plane of the lens layer 210), and a second lens surface group 213b consisting of a number of second lens surfaces 214b which are inclined toward the opposite side from the normal direction nd. The first lens surface group 213a is disposed on one side of the linear Fresnel lens portion 213 along the first direction d1, while the second lens surface group 213b is disposed on the other side of the linear Fresnel lens portion 213 along the first direction d1. The first lens surfaces 214a and the second lens surfaces 214b constitute the lens surfaces 214 of the linear Fresnel lens sheet 203.

The lens surfaces 214 are arranged along the first direction d1 extending in the sheet plane 203a of the linear Fresnel lens sheet 203. Thus, the first lens surfaces 214a and the second lens surfaces 214b are both arranged along the first direction d1. The first lens surfaces 214a are arranged with the same pitch P, and the second lens surfaces 214b are also arranged with the same pitch P. Each lens surface 214 extends linearly in a direction intersecting the first direction d1, in particular in a direction perpendicular to the first direction d1.

The lens angle $\alpha$ of a lens surface 214, which is the angle of the lens surface 214 with respect to the sheet plane 203a of the linear Fresnel lens sheet 203, gradually changes along the first direction d1. In this embodiment the lens angle $\alpha$ of a first lens surface 214a is larger than the lens angle $\alpha$ of any other first lens surface 214a located nearer to the flat portion 216 in the first direction d1. Similarly, the lens angle $\alpha$ of a second lens surface 214b is larger than the lens angle $\alpha$ of any other second lens surface 214b located nearer to the flat portion 216 in the first direction d1.

A rise surface 215 is provided between two adjacent lens surfaces 214. The length of each rise surface 215 is generally determined by the pitch P of the adjacent lens surfaces 214 and the lens angle $\alpha$ of the lens surface 214. As described above, the lens angle $\alpha$ of each lens surface 214 increases with the distance of the lens surface 214 from the middle of the linear Fresnel lens portion 213 in the first direction d1. Accordingly, an outer rise surface 215, lying in an outer position in the first direction d1, has a longer length along the normal direction nd than any inner rise surface 215. No lens effect on light is expected of the rise surfaces 215.

The flat portion 216 is provided between the first lens surface group 213a and the second lens surface group 213b. The flat portion 216 will now be described with reference to FIG. 9. As shown in FIG. 9, the flat portion 216 includes at least one flat surface 217 which extends along the sheet plane 203a of the linear Fresnel lens sheet 203. The phrase "the flat surface(s) 217 extends along the sheet plane 203a" herein includes not only the case where the flat surface(s) 217 extends exactly parallel to the sheet surface 203a, but also the case where the flat surface(s) 217 can be regarded as being substantially flat, such as in the case where the flat surface(s) 217 is slightly inclined due to the accuracy of machining of the below-described roll-shaped mold 100, the accuracy of shaping of the linear Fresnel lens sheet 203, etc. For example, when the inclination angle of the flat surface(s) 217 with respect to the sheet plane 203a of the linear Fresnel lens sheet 203 is 0 degree as a value rounded off to two decimal places, the flat surface(s) 217 can fully achieve the required optical performance and can be regarded as being substantially flat. The flat surface(s) 217 may have fine irregularities or slight undulations as long as the flat surface(s) 217 can be regarded as extending along the sheet plane 203a of the linear Fresnel lens sheet 203 when taking a wide and global view.

In the case where the flat surface(s) 217 is slightly inclined, the inclination angle of the flat surface(s) 217 with respect to the sheet plane 203a is smaller than the lens angle $\alpha$ of each first lens surface 214a and the lens angle $\alpha$ of each second lens surface 214b. In view of this, the lens angle $\alpha$ of the first lens surface 214a, lying closest to the flat portion 216, of the first lens surface group 213a with respect to the sheet plane 203a is preferably not less than 0.01 degrees as a value rounded off to two decimal places. As described above, when the lens angle $\alpha$ of the first lens surface 214a with respect to the sheet plane 203a is 0.00 degree as a value rounded off to two decimal places, the first lens surface 214a can be regarded as being substantially flat. On the other hand, it is difficult to machine such a lens surface with high accuracy. If the first lens surface 214a, having a lens angle $\alpha$ of 0.00 degree as a value rounded off to two decimal places, is formed, the first lens surface 214a sometimes cannot achieve the intended optical effect worth the machining cost. Similarly, the lens angle $\alpha$ of the second lens surface 214b, lying closest to the flat portion 216, of the second lens surface group 213b with respect to the sheet plane 203a is preferably not less than 0.01 degrees as a value rounded off to two decimal places.

In this embodiment the flat portion 216 preferably includes a plurality of flat surfaces 217. Such a flat portion 216 can have a weak diffusing effect, making it possible to further reduce a difference in brightness which may be produced around the middle portion of the linear Fresnel lens sheet 203 depending on the viewing position of an observer. In addition, the flat surfaces 217 have the same length L along the sheet plane 203a. Therefore, by adjusting the length L of each flat surface 217 in advance, it is possible to obscure moire caused by the arrangement of the flat surfaces 217 of the flat portion 216 and the arrangement of other optical elements used together with the linear Fresnel lens sheet 203, for example, the lens arrangement of a lenticular lens sheet in a projection screen or the arrangement of pixels that form image light. Thus, the occurrence of unexpected moire can be effectively prevented. For example, when using the linear Fresnel lens sheet 203 of this embodiment in a projection screen, moire is likely to occur when the pixel size of image light entering the linear Fresnel lens sheet 203 is close to the length L of each flat surface 217 along the sheet plane 203a. Therefore, the length L of each flat surface 217 is set to be not more than ⅕ of the pitch of the pixels of image light along the sheet plane 203a.

As will be described below, in general, as the length L of each flat surface 217 along the sheet plane 203a increases, undulations or irregularities are more likely to be randomly formed on the corresponding surface of a roll-shaped mold for producing the linear Fresnel lens sheet 203, leading to the random formation of undulations or irregularities on the flat surfaces 217 of the linear Fresnel lens sheet 203. When light enters such undulations or irregularities randomly formed on the flat surfaces 217, the light will be deflected to an unintended direction. Therefore, when a viewer views an area around the flat surfaces 217, a difference in brightness can appear in the area around the flat surfaces 217. According to this embodiment, however, the length L of each of the flat surfaces 217 constituting the flat portion 216 can be adjusted to a relatively small value in advance. This makes it possible to prevent the random formation of undulations or irregularities on the flat surfaces 217 of the linear Fresnel lens sheet 203, thereby preventing the production of a difference in brightness in an area around the flat surfaces 217.

As described above, with regard to the relationship between the flat surfaces 217 and the sheet plane 203a, the inclination angle of each flat surface 217 with respect to the sheet plane 203a may be, for example, about 0 degree as a value rounded off to two decimal places in order for the flat surfaces 217 to fully achieve the required optical performance. On the other hand, with regard to the relationship between the flat surfaces 217, the flat surfaces 217 are preferably parallel to each other in order for the flat surfaces 217 to fully achieve the required optical performance. For example, the flat surfaces 217 can be regarded as being parallel to each other if any two of them make an angle of 0.00 degree as a value rounded off to two decimal places, preferably not more than 0.002 degrees as a value rounded off to three decimal places.

The flat surfaces 217 comprise a first flat surface group 216a consisting of a plurality of first flat surfaces 217a, and a second flat surface group 216b consisting of a plurality of second flat surfaces 217b. The second flat surface group 216b lies between the first flat surface group 216a and the second lens surface group 213b. A first flat surface 217a lies in an inner position in the normal direction nd, in other words in a lower position in the normal direction nd, with respect to any other first flat surface 217a located nearer to the first lens surface group 213a in the first direction d1. Similarly, a second flat surface 217b lies in an inner position in the normal direction nd, in other words in a lower position in the normal direction nd, with respect to any other second flat surface 217b located nearer to the second lens surface group 213b in the first direction d1. As described below, the flat surfaces 217 having such a construction can effectively prevent the random formation of circumferentially-extending streaks in the flat cylindrical portions 131 of a roll-shaped mold 100. This makes it possible to more effectively prevent the occurrence of unexpected moire due to the arrangement of the flat surfaces 217 of the linear Fresnel lens sheet 203 and the arrangement of other optical elements used together with the linear Fresnel lens sheet 203.

As shown in FIG. 9, a first flat-portion rise surface 218a is provided between two adjacent first flat surfaces 217a, while a second flat-portion rise surface 218b is provided between two adjacent second flat surfaces 217b. The first flat-portion rise surfaces 218a and the second flat-portion rise surfaces 218b may all have the same length or different lengths.

Further, as shown in FIG. 9, in a cross-section parallel to both the first direction d1 and the normal direction nd, the first flat surfaces 217a of the first flat surface group 216a and the second flat surfaces 217b of the second flat surface group 216b are constructed symmetrically (in terms of the shape and the arrangement). However, the first flat surfaces 217a of the first flat surface group 216a and the second flat surfaces 217b of the second flat surface group 216b may be constructed asymmetrically. For example, the first flat surfaces 217a of the first flat surface group 216a may lie in different positions in the normal direction nd from those of the second flat surfaces 217b of the second flat surface group 216b. This can further obscure moire due to the arrangement of the flat surfaces 217 and the arrangement of other optical elements used together with the linear Fresnel lens sheet 203.

The operation of the transmissive display device of this embodiment will now be described with reference to the drawings.

Consider the case in which lights L1 to L4, mainly comprising parallel light rays, enter the linear Fresnel lens sheet 203. Light L1 that exits a first lens surface 214a and light L2 that exits a second lens surface 214b are refracted at the lens surfaces 214a, 214b and concentrated into a predetermined light-concentrated area (focus area in the illustrated case). On the other hand, light L3-L4 that exits flat surfaces 217 maintain its traveling direction upon exiting the flat surfaces 217 because the flat surfaces 217 are parallel to the sheet plane 203a. In particular, in the illustrated case, the light L3-L4 travels in a direction parallel to the normal direction nd before and after exiting the flat surfaces 217. Therefore, at least part of the light L3-L4 that has exited the flat surfaces 217 can be viewed in the predetermined light-concentrated area (focus area in the illustrated case). This makes it possible to effectively reduce and obscure a difference in brightness between a middle portion and the other portion of the linear Fresnel lens sheet 203, as perceived by a viewer who views light concentrated in the light-concentrated area.

As described hereinabove, according to this embodiment, the flat portion 216 including at least one flat surface 217 is provided between the first lens surface group 213a and the second lens surface group 213b. This makes it possible to improve and reduce a difference in brightness between a middle portion and the other portion of the linear Fresnel lens sheet 203, which can be produced depending on the viewing position of a viewer, to an imperceptible level. In addition, with the flat portion 216 provided between the first lens surface group 213a and the second lens surface group 213b, there is no navel as defined by those lens surfaces whose inclination angles with respect to the normal direction nd are symmetrical. Accordingly, there is no deterioration in the quality of display images due to the appearance of such a navel.

Figure 10:
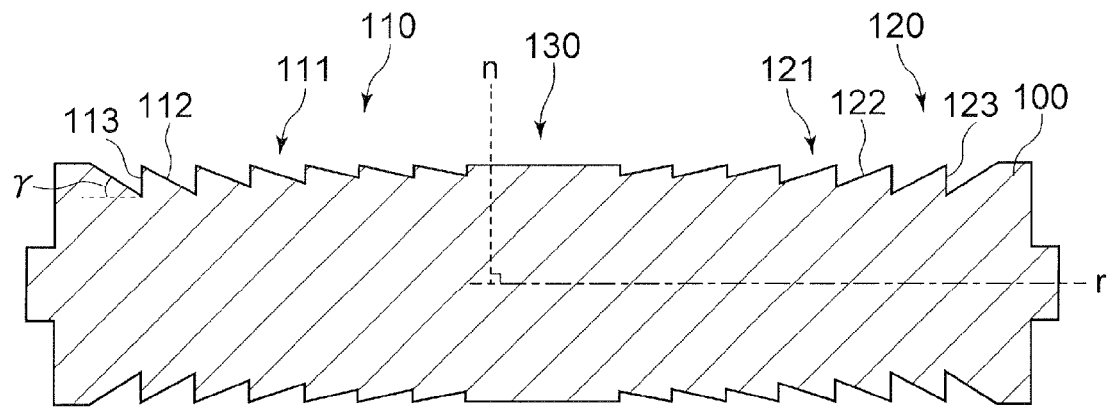
FIG. 10 is a schematic cross-sectional view showing a cross-section passing through the axis of a roll-shaped mold for producing the linear Fresnel lens sheet shown in FIG. 8.
Figure 11:
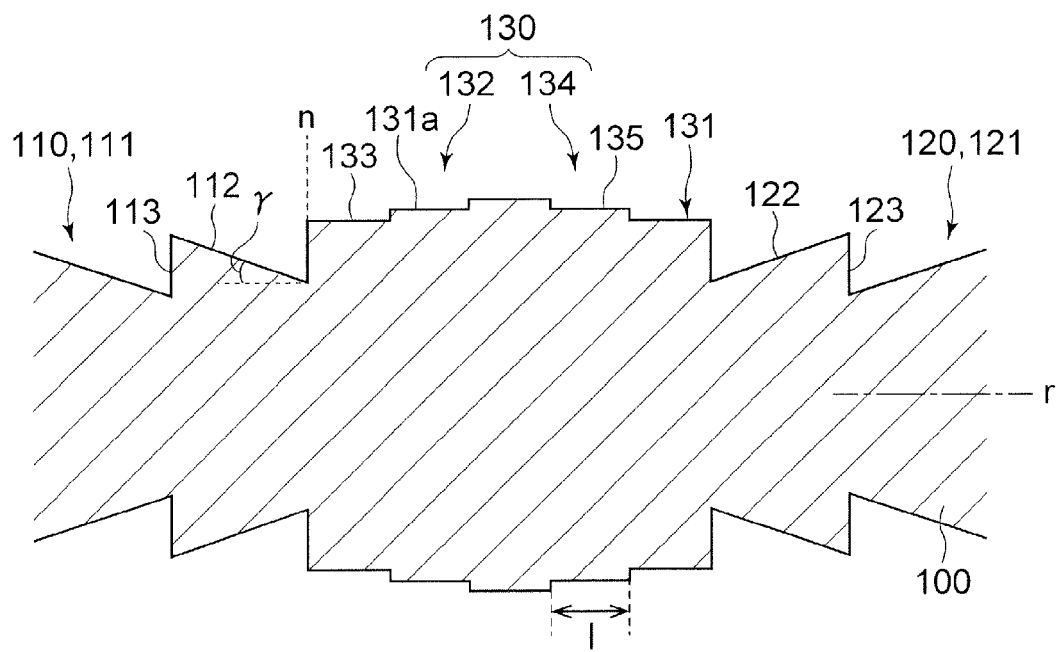
FIG. 11 is a partial enlarged cross-sectional view of a middle portion of the roll-shaped mold shown in FIG. 10.

A roll-shaped mold 100 to be used for producing the linear Fresnel lens sheet 203 will now be described mainly with reference to FIGS. 10 and 11. FIG. 10 is a schematic cross-sectional view showing a cross-section passing through the axis of the roll-shaped mold 100 for producing the linear Fresnel lens sheet shown in FIG. 8. FIG. 11 is a partial enlarged cross-sectional view of a middle portion of the roll-shaped mold 100 shown in FIG. 10.

As shown in FIG. 10, the roll-shaped mold 100 has inclined surfaces, arranged in the axial direction r, for producing the lens surfaces of the linear Fresnel lens sheet 203, and includes a first annular groove group 110 consisting of a number of first annular grooves 111, and a second annular groove group 120 consisting of a number of second annular grooves 121. The first annular groove group 110 is disposed on one side of the roll-shaped mold 100 along the axial direction r, while the second annular groove group 120 is disposed on the other side of the roll-shaped mold 100 along the axial direction r. The first annular grooves 111 include first inclined surfaces 112 which are inclined toward one side from the radial direction n perpendicular to the axial direction r in a cross-section passing through the axis of the roll-shaped mold 100. The first inclined surfaces 112 are arranged with the same pitch. The inclination angle γ of the first inclined surface 112 of a first annular groove 111 with respect to the axial direction r is larger than the inclination angle γ of the first inclined surface 112 of any other first annular groove 111, located nearer to a flat cylindrical portion(s) 131 in the axial direction r, with respect to the axial direction r. On the other hand, the second annular grooves 121 include second inclined surfaces 122 which are inclined toward the opposite side from the radial direction n in a cross-section passing through the axis of the roll-shaped mold 100. The second inclined surfaces 122 are arranged with the same pitch. The inclination angle γ of the second inclined surface 122 of a second annular groove 121 with respect to the axial direction r is larger than the inclination angle γ of the second inclined surface 122 of any other second annular groove 121, located nearer to the flat cylindrical portion(s) 131 in the axial direction r, with respect to the axial direction r. The first lens surface group 213a and the second lens surface group 213b of the linear Fresnel lens sheet 203 are shaped by the first annular groove group 110 and the second annular groove group 120 of the roll-shaped mold 100, respectively. The first lens surfaces 214a and the second lens surfaces 214b of the linear Fresnel lens sheet 203 are shaped by the first inclined surfaces 112 and the second inclined surfaces 122 of the roll-shaped mold 100, respectively.

As shown in FIG. 10, each first annular groove 111 has a first annular-groove rise surface 113 extending in the radial direction n of the roll-shaped mold 100. Each first annular-groove rise surface 113 is formed between two adjacent first inclined surfaces 112. The length of each first annular-groove rise surface 113 is generally determined by the pitch of the first annular grooves 111 and the inclination angle $\gamma$ of the first inclined surface 112. As described above, the pitch of the first annular grooves 111 is constant, and the inclination angle $\gamma$ of a first inclined surface 112 is larger than the inclination angle $\gamma$ of any other first inclined surface 112 located nearer to the flat cylindrical portion(s) 131 in the axial direction r. Accordingly, an outer first annular-groove rise surface 113, lying in an outer position in the axial direction r, has a longer length in the radial direction n than any inner first annular-groove rise surface 113. Similarly, each second annular groove 121 has a second annular-groove rise surface 123. Each second annular-groove rise surface 123 is formed between two adjacent second inclined surfaces 122. An outer second annular-groove rise surface 123, lying in an outer position in the axial direction r, has a longer length in the radial direction n than any inner second annular-groove rise surface 123. The rise surfaces of the linear Fresnel lens sheet 203 are shaped by the first annular-groove rise surfaces 113 and the second annular-groove rise surfaces 123 of the roll-shaped mold 100.

The roll-shaped mold 100 has an intermediate portion 130 disposed between the first annular groove group 110 and the second annular groove group 120. The flat portion 216 of the linear Fresnel lens sheet 203 is shaped by the intermediate portion 130. The intermediate portion 130 will now be described with reference to FIG. 11. As shown in FIG. 11, the intermediate portion 130 comprises at least one flat cylindrical portion 131. The diameter of the flat cylindrical portion(s) 131 is constant along the axial direction r. The phrase "the diameter of the flat cylindrical portion(s) 131 is constant along the axial direction r" herein is not limited to the strict sense, and includes the case where the diameter of the flat cylindrical portion(s) 131 can be regarded as being substantially constant, such as in the case where the diameter of the flat cylindrical portion(s) 131 slightly varies along the axial direction r due to the accuracy of machining of the roll-shaped mold 100, etc. For example, when in a cross-section passing through the axis of the roll-shaped mold 100, the inclination angle of the flat cylindrical portion(s) 131 with respect to the axial direction r is 0.00 degree as a value rounded off to two decimal places, the flat surface(s) 217 of the linear Fresnel lens sheet 203, shaped by the flat cylindrical portion(s) 131, can fully achieve the required optical performance and the flat cylindrical portion(s) 131 can be regarded as being substantially flat. The flat cylindrical portion(s) 131 may have fine irregularities or slight undulations as long as the diameter can be regarded as constant when taking a wide and global view.

In the case where the flat cylindrical portion(s) 131 is slightly inclined, the inclination angle of the peripheral cylindrical surface(s) of the flat cylindrical portion(s) 131 with respect to the axial direction r, in a cross-section passing through the axis of the roll-shaped mold 100, is smaller than the inclination angle $\gamma$ of each first inclined surface 112 and the inclination angle $\gamma$ of each second inclined surface 122. In view of this, the inclination angle $\gamma$ of the first inclined surface 112 of the first annular groove 111, lying closest to the intermediate portion 130, with respect to the axial direction r is preferably not less than 0.01 degrees as a value rounded off to two decimal places. As described above, when the inclination angle $\gamma$ of the first inclined surface 112 with respect to the axial direction r is 0.00 degree as a value rounded off to two decimal places, the first inclined surface 112 can be regarded as being substantially flat. On the other hand, it is difficult to machine such a first inclined surface 112 with high accuracy. If the first inclined surface 112, having an inclination angle $\gamma$ of 0.00 degree as a value rounded off to two decimal places, is formed, the linear Fresnel lens sheet 203 produced sometimes cannot achieve the intended optical effect worth the machining cost. Similarly, the inclination angle $\gamma$ of the second inclined surface 122 of the second annular groove 121, lying closest to the intermediate portion 130, with respect to the axial direction r is preferably not less than 0.01 degrees as a value rounded off to two decimal places.

In this embodiment the intermediate portion 130 is configured as a flat cylindrical portion group including a plurality of flat cylindrical portions 131. The flat portion 216 of the linear Fresnel lens sheet 203, shaped by such an intermediate portion 130, can have a weak diffusing effect. This makes it possible to further reduce a difference in brightness which may be produced around the middle portion of the linear Fresnel lens sheet 203 depending on the viewing position of an observer. In addition, the flat cylindrical portions 131 have the same length l along the axial direction r. Therefore, by adjusting the length l of each flat cylindrical portion 131 in advance, it is possible to obscure moire caused by the arrangement of the flat surfaces 217 of the flat portion 216 of the linear Fresnel lens sheet 203, shaped by the mold 100, and the arrangement of other optical elements used together with the linear Fresnel lens sheet 203, for example, the lens arrangement of a lenticular lens sheet in a projection screen or the arrangement of pixels that form image light. Thus, the occurrence of unexpected moire can be effectively prevented.

As will be described below, in general, as the length l of each flat cylindrical portion 131 along the axial direction r increases, undulations or irregularities are more likely to be randomly formed on the flat cylindrical portions 131, leading to the random formation of undulations or irregularities on the flat surfaces 217 of the linear Fresnel lens sheet 203 shaped by the mold 100. When light enters the undulations or irregularities randomly formed on the flat surfaces 217, the light will be deflected to an unintended direction. Therefore, when a viewer vies an area around the flat surfaces 217, a difference in brightness can appear in the area around the flat surfaces 217. According to this embodiment, however, the length l of each of the flat cylindrical portions 131, constituting the intermediate portion 130, along the axial direction r can be adjusted to a relatively small value in advance. This makes it possible to prevent the random formation of undulations or irregularities on the flat surfaces 217 of the linear Fresnel lens sheet 203, thereby preventing the production of a difference in brightness in an area around the flat surfaces 217.

In the case of a flat cylindrical portion 131 having a long length l along the axial direction r, in order to prevent the random formation of undulations or irregularities on the flat cylindrical portion 131 upon its machining, it is conceivable to use a method which comprises dividing the flat cylindrical portion 131 into a plurality of sections along the axial direction r, and independently machining each section with a turning tool 101. However, due to the accuracy of positioning of the turning tool 101, it is difficult to smoothly form the boundaries between the sections; a circumferentially-extending streak(s) may be formed randomly between the sections, leading to the random formation of a circumferentially-extending streak(s) on the flat surfaces 217 of the linear Fresnel lens sheet 203 shaped by the mold 100. The circumferentially-extending streak(s) randomly formed on the flat surfaces 217 of the linear Fresnel lens sheet 203 can cause moire in relation to the arrangement of other optical elements used together with the linear Fresnel lens sheet 203, for example, the lens arrangement of a lenticular lens sheet in a projection screen or the arrangement of pixels that form image light. According to this embodiment, on the other hand, there is no need to use such a machining method because the length l of each of the flat cylindrical portions 131, constituting the intermediate portion 130, along the axial direction r can be adjusted to a relatively small value. This makes it possible to prevent the occurrence of unexpected moire due to the arrangement of the flat surfaces 217 of the linear Fresnel lens sheet 203 shaped by the mold 100 and the arrangement of other optical elements used together with the linear Fresnel lens sheet 203.

As described above, when in a cross-section passing through the axis of the roll-shaped mold 100, the inclination angle of a flat cylindrical portion 131 with respect to the axial direction r is 0.00 degree as a value rounded off to two decimal places, the flat surface 217 of the linear Fresnel lens sheet 203, shaped by the flat cylindrical portion 131, can fully achieve the required optical performance. With regard to the relationship between the flat cylindrical portions 131, in a cross-section passing through the axis of the roll-shaped mold 100, the peripheries 131a of the flat cylindrical portions 131, extending in the axial direction r, are preferably parallel to each other. The peripheries 131a of the flat cylindrical portions 131 can be regarded as being parallel to each other if any two of the peripheries 131a make an angle of 0.00 degree as a value rounded off to two decimal places, preferably not more than 0.002 degrees as a value rounded off to three decimal places.

The intermediate portion 130 comprises a first flat cylindrical portion group 132 consisting of a plurality of first flat cylindrical portions 133, and a second flat cylindrical portion group 134 consisting of a plurality of second flat cylindrical portions 135 and lying between the first flat cylindrical portion group 132 and the second annular groove group 120. A first flat cylindrical portion 133 has a larger diameter than any other first flat cylindrical portion 133 located nearer to the first annular groove group 110 in the axial direction r. A second flat cylindrical portion 135 has a larger diameter than any other second flat cylindrical portion 135 located nearer to the second annular groove group 120 in the axial direction r. The intermediate portion 130 having such a construction can effectively prevent the random formation of circumferentially-extending streaks in the flat cylindrical portions 131. This makes it possible to effectively prevent the occurrence of unexpected moire due to the arrangement of the flat surfaces 217 of the linear Fresnel lens sheet 203 shaped by the mold 100 and the arrangement of other optical elements used together with the linear Fresnel lens sheet 203.

Further, as shown in FIG. 11, in a cross-section parallel to both the axial direction r and the normal direction n, the first flat cylindrical portions 133 of the first flat cylindrical portion group 132 and the second flat cylindrical portions 135 of the second flat cylindrical portion group 134 are constructed symmetrically (in terms of the shape and the arrangement). However, the first flat cylindrical portions 133 of the first flat cylindrical portion group 132 and the second flat cylindrical portions 135 of the second flat cylindrical portion group 134 may be constructed asymmetrically. For example, the first flat cylindrical portions 133 of the first flat cylindrical portion group 132 may lie in different positions in the normal direction n from those of the second flat cylindrical portions 135 of the second flat cylindrical portion group 134. This can more effectively prevent the occurrence of unexpected moire due to the arrangement of the flat surfaces 217 of the linear Fresnel lens sheet 203 shaped by the mold 100 and the arrangement of other optical elements used together with the linear Fresnel lens sheet 203.

Figure 12:
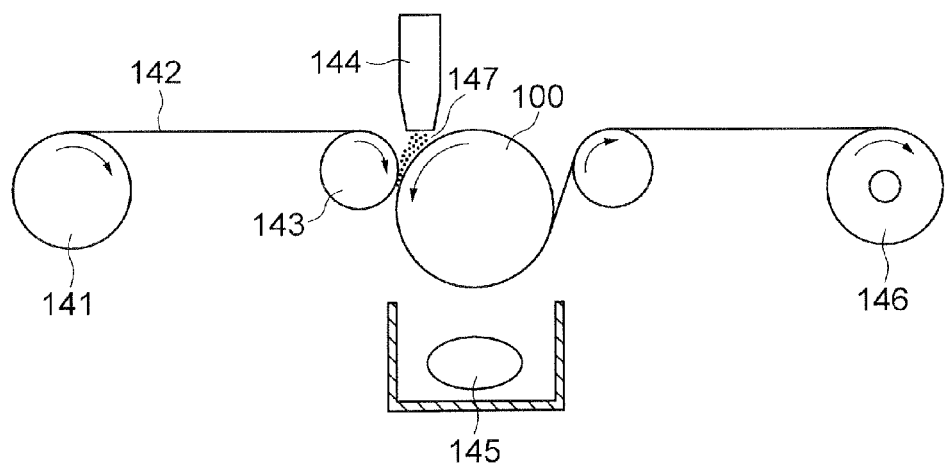
FIG. 12 is a schematic view illustrating an exemplary method for producing a linear Fresnel lens sheet by using the roll-shaped mold shown in FIG. 10.

A method for producing the linear Fresnel lens sheet 203 by using the roll-shaped mold 100 will now be described mainly with reference to FIG. 12. FIG. 12 is a schematic view illustrating an exemplary method for producing the linear Fresnel lens sheet 203 by using the roll-shaped mold 100 shown in FIG. 10. As shown in FIG. 12, a substrate sheet 142 comprised of a substrate 230 is unrolled from a raw roll 141 and supplied between a pressure roller 143 and the roll-shaped mold 100 for shaping the lens surfaces 214 of the linear Fresnel lens sheet 203, while a UV curable resin 147 is supplied from a UV curable resin supply section 144 to between the substrate sheet 142 and the roll-shaped mold 100. The substrate sheet 142 and the UV curable resin 147 are nipped between the pressure roller 143 and the roll-shaped mold 100, and conveyed along the periphery of the roll-shaped mold 100. A UV lamp 145 is disposed near the periphery of the roll-shaped mold 100. Ultraviolet light is emitted from the UV lamp 145 and applied to the UV curable resin 147 to cure the resin and shape lens surfaces 214 on the resin. The cured resin adheres to the substrate sheet 142; the cured resin and the substrate sheet 142 form a linear Fresnel lens sheet 203. The linear Fresnel lens sheet 203 obtained is wound onto a take-up roller 146.

A method for producing the roll-shaped mold 100 will now be described mainly with reference to FIGS. 13A through 13E.

Figure 13A:
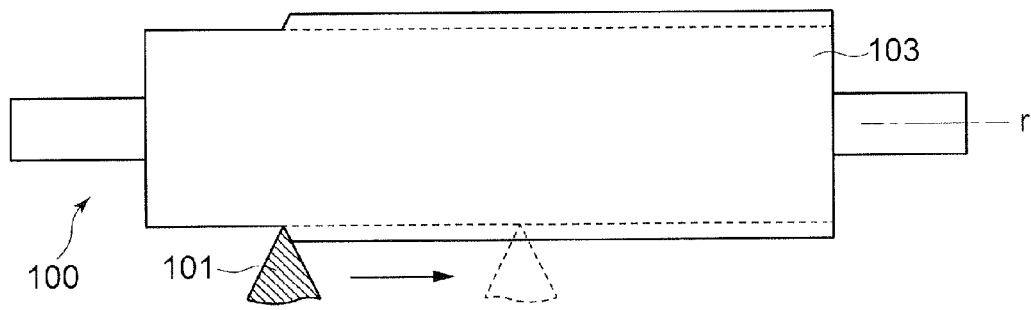
FIG. 13A is a schematic view illustrating a method for producing the roll-shaped mold shown in FIG. 10, showing the step of performing surface smoothing of the roll-shaped mold.
Figure 13B:
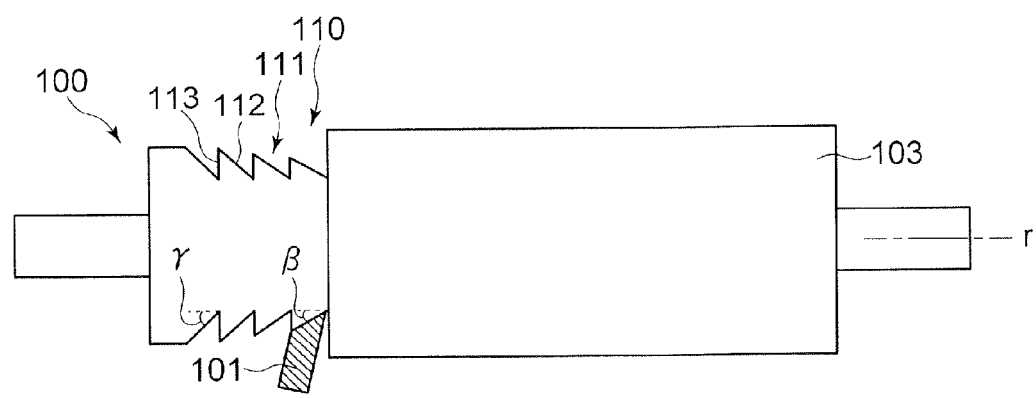
FIG. 13B is a schematic view illustrating a method for producing the roll-shaped mold shown in FIG. 10, showing the step of forming a first annular groove group from one end toward the middle of the roll-shaped mold in the axial direction.

First, as shown in FIG. 13A, a substrate roller 103 made of a metal is prepared, and surface smoothing of the substrate roller 103 is performed with a turning tool 101. Next, as shown in FIG. 13B, a first annular groove group 110, consisting of a number of first annular grooves 111, is formed sequentially from one end toward the middle of the roll-shaped mold 100 (substrate roller 103) in the axial direction r. Each first annular groove 111 has a first inclined surface 112 for the production of a lens surface. The inclination angle γ of a first inclined surface 112 with respect to the axial direction r increases with the distance of the first inclined surface 112 from the middle of the roll-shaped mold 100 in the axial direction r. Thus, the cutting angle β of the turning tool 101 with respect to the axial direction r is made smaller for a first inclined surface 112 than for the adjacent first inclined surface 112 lying farther from the middle of the roll-shaped mold 100 in the axial direction r. In particular, the substrate roller 103 is machined by advancing the turning tool 101 in the radial direction n while keeping the cutting edge of the turning tool 101 at a predetermined cutting angle β with respect to the axial direction r, thereby forming a first annular groove 111. The turning tool 101 is then retreated. Next, after moving the turning tool 101 in the axial direction r, the position of the turning tool 101 is changed to make the cutting angle β of the turning tool 101 smaller, and machining of the next first annular groove 111 is started. Machining of first annular grooves 111 on the substrate roller 103 is performed to a position at a predetermined distance from the middle of the substrate roller 103 in the axial direction r.

Figure 13C:
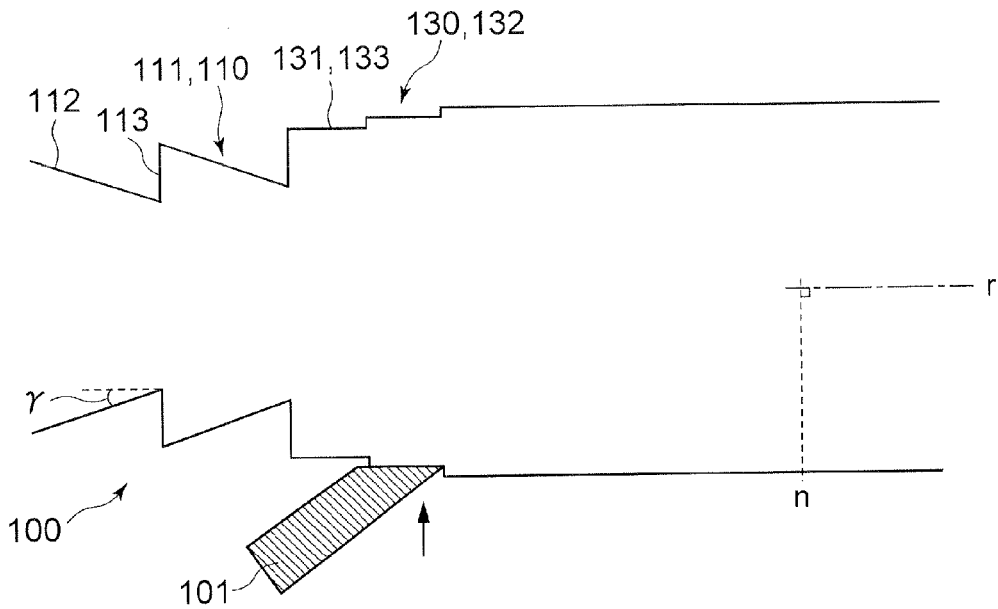
FIG. 13C is a schematic view illustrating a method for producing the roll-shaped mold shown in FIG. 10, showing the step of forming a first flat cylindrical portion group toward the middle of the roll-shaped mold in the axial direction.

After the formation of the first annular groove 111, machining of the first flat cylindrical portion group 132 of the intermediate portion 130 is started. As shown in FIG. 13C, each first flat cylindrical portion 133 is formed by moving the turning tool 101 in the radial direction n while keeping the cutting edge of the turning tool 101 parallel to the axial direction r. In particular, as shown in FIG. 13C, a first flat cylindrical portion group 132, consisting of a number of first flat cylindrical portions 133, is formed sequentially from the above position to the middle of the substrate roller 103 in the axial direction r. The diameter of a first flat cylindrical portion 133 decreases with the distance of the first flat cylindrical portion 133 from the middle of the roll-shaped mold 100 in the axial direction r. Thus, the cutting depth of the turning tool 101 in the radial direction n is made smaller for a first flat cylindrical portion 133 than for the adjacent first flat cylindrical portion 133 lying farther from the middle of the substrate roller 103 in the axial direction r.

Figure 13D:
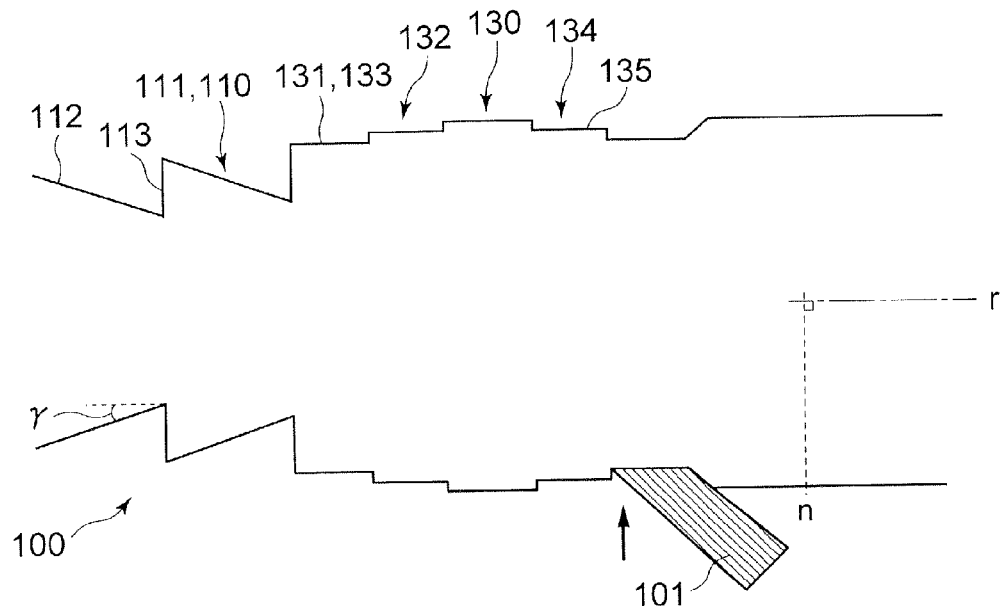
FIG. 13D is a schematic view illustrating a method for producing the roll-shaped mold shown in FIG. 10, showing the step of forming a second flat cylindrical portion group from the middle toward the other end of the roll-shaped mold in the axial direction.
Figure 13E:
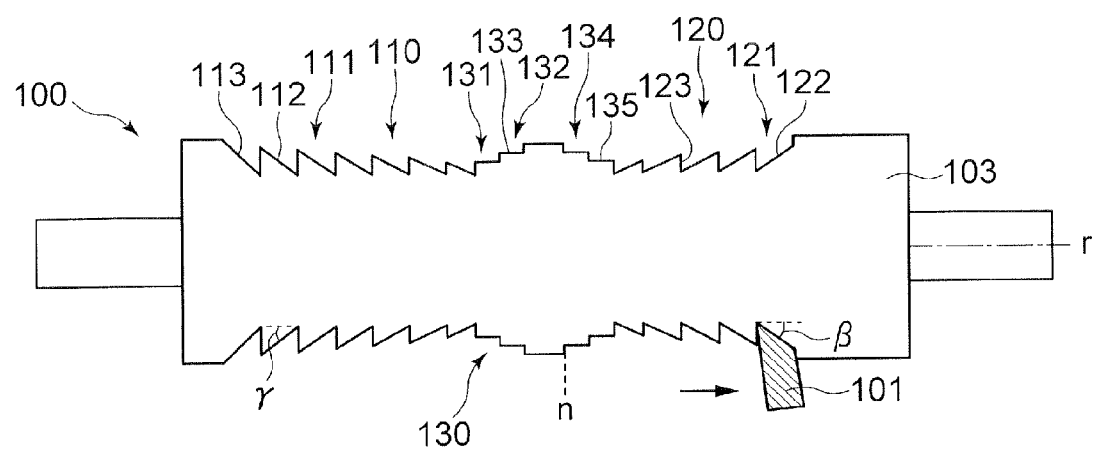
FIG. 13E is a schematic view illustrating a method for producing the roll-shaped mold shown in FIG. 10, showing the step of forming a second annular groove group toward the other end of the roll-shaped mold in the axial direction.
Figure 15:
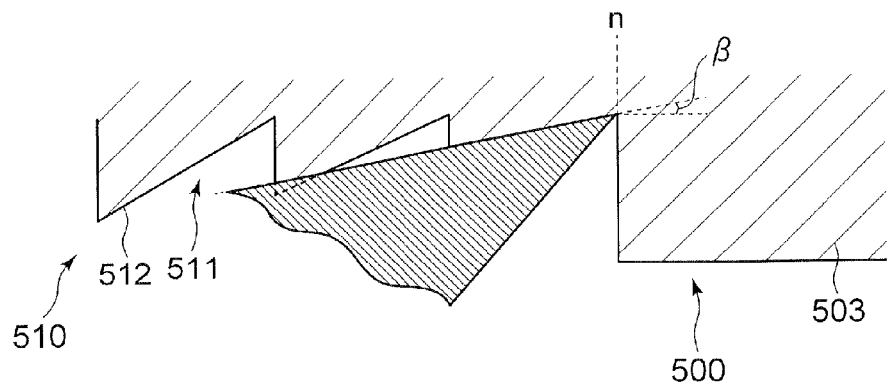
FIG. 15 is a schematic enlarged view illustrating the formation of an annular groove in a middle portion of the roll-shaped mold.
Figure 16:
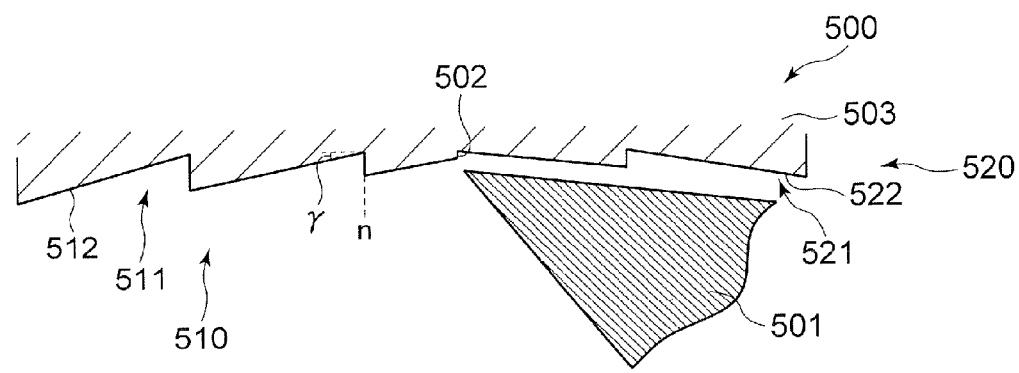
FIG. 16 is a schematic enlarged view of a region around the boundary between the first annular groove group and the second annular groove group of the roll-shaped mold.
Figure 17:
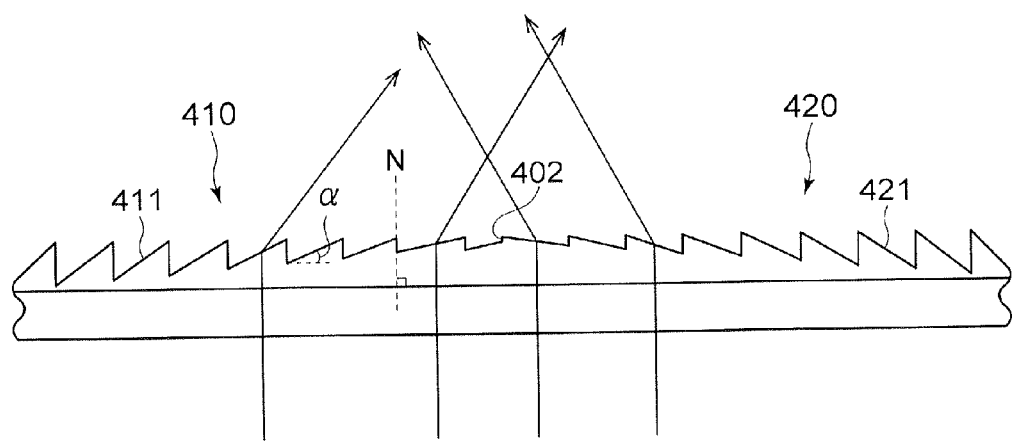
FIG. 17 is a schematic view of a linear Fresnel lens sheet shaped by the use of the roll-shaped mold produced by the method illustrated in FIG. 14($a$) through 14($c$)
Figure 18:
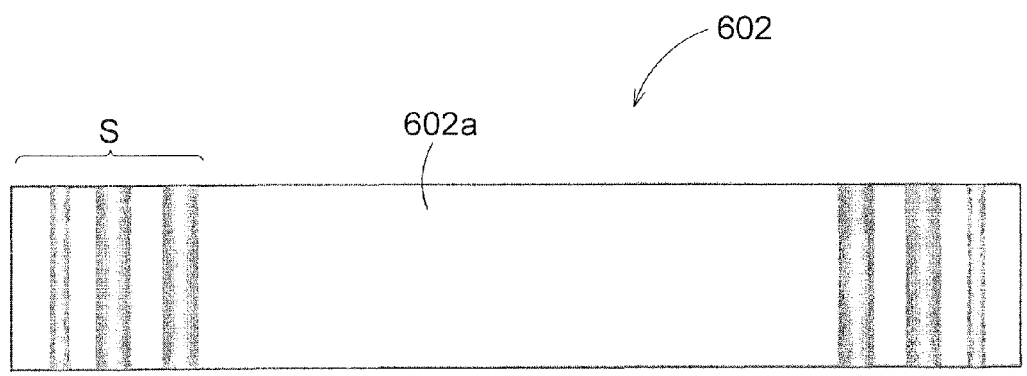
FIG. 18 is a diagram schematically showing a stripe pattern which can appear on the light exit-side surface of a transmissive screen.

After the formation of the first flat cylindrical portion group 132, the turning tool 101 is replaced with a new one. Thereafter, machining of the second flat cylindrical portion group 134 is started from the middle of the substrate roller 103. In particular, as shown in FIG. 13D, a second flat cylindrical portion group 134, consisting of a number of second flat cylindrical portions 135, is formed sequentially on the opposite side of the substrate roller 103 in the axial direction r. The diameter of a second flat cylindrical portion 135 decreases with the distance of the second flat cylindrical portion 135 from the middle of the roll-shaped mold 100 in the axial direction r. Thus, the cutting depth of the turning tool 101 in the radial direction n is made larger for a second flat cylindrical portion 135 than for the adjacent second flat cylindrical portion 135 lying nearer to the middle of the substrate roller 103 in the axial direction r. After the formation of the second flat cylindrical portion group 134, a second annular groove group 120 is formed sequentially toward the end of the substrate roller 103 in substantially the same manner as in the formation of the first annular groove group 110, as shown in FIG. 13E.

According to the above-described method for producing the roll-shaped mold 100, the intermediate portion 130 contains a plurality of flat cylindrical portions 131 each having the same length l in the axial direction r, and therefore the length l of each flat cylindrical portion 131 in the axial direction r can be made relatively small. Thus, the area of contact between the turning tool 101 and each flat cylindrical portion 131 can be made relatively small. This can reduce the resistance between the turning tool 101 and the substrate roller 103 during machining of each flat cylindrical portion 131, making it possible to prevent the random formation of irregularities on the flat cylindrical portions 131 and machine the flat cylindrical portions 131 with high accuracy.

As described above, according to the method for producing the roll-shaped mold 100, the diameter of a first or second flat cylindrical portion 133, 135 of the intermediate portion 130 decreases with the distance of the first or second flat cylindrical portion 133, 135 from the middle of the roll-shaped mold 100 in the axial direction r. Accordingly, when machining a first flat cylindrical portion 131 with the turning tool 101 while keeping the cutting edge of the turning tool 101 parallel to the axial direction r, a first flat cylindrical portion 131, lying adjacent to the first flat cylindrical portion 131 being machined, will not change the preferable position of the turning tool 101. Thus, the cutting edge of the turning tool 101 can be stably kept parallel to the axial direction r during machining of each first flat cylindrical portion 131. This enables high-accuracy machining of the flat cylindrical portions 131.

While the present invention has been described with reference to the preferred embodiments, it is of course possible to combine the embodiments in an appropriate manner. For example, the linear Fresnel lens portion 13 of the linear Fresnel lens sheet 3 according to the first embodiment may include the flat portion 216 according to the third embodiment. Each of the linear Fresnel lens portions 13 of the linear Fresnel lens sheet 3 according to the second embodiment may be comprised of the linear Fresnel lens portion 213 according to the third embodiment.

The invention claimed is:

1. A transmissive display device comprising: a linear Fresnel lens sheet comprising a lens layer having a first surface in which a linear Fresnel lens portion, having lens surfaces arranged in a first direction, is formed, and a second surface opposite the first surface; and a diffusion layer disposed on the side of the second surface of the lens layer, and
   a light source having a projection surface for projecting image light onto the diffusion layer of the linear Fresnel lens sheet,
   wherein a degree of internal diffusion of the diffusion layer, which is the degree of diffusion of light by the diffusion layer in the linear Fresnel lens sheet as expressed in terms of a haze value, is not less than 70%, and
   wherein the following relation is satisfied: $-\alpha1°+\arcsin(1/n)° + \arcsin(1/n\cdot\sin\theta i)° \leq 10°$
   where $\alpha1°$ is the angle of the lens surface, lying farthest from the projection surface of the light source, with respect to a sheet plane of the lens layer, n is a refractive index of the lens layer, and $\theta i°$ is an angle formed between a normal direction to the sheet plane of the lens layer and an imaginary line connecting the center of the projection surface of the light source with a center of the lens surface lying farthest from the projection surface of the light source.

2. The transmissive display device according to claim 1, wherein a maximum distance between the linear Fresnel lens portion of the lens layer and a surface of the diffusion layer, lying on the side opposite from the lens layer, is not more than 1.0 mm.

3. The transmissive display device according to claim 1, wherein the linear Fresnel lens portion includes a first lens surface group consisting of first lens surfaces which are inclined toward one side from the normal direction to the sheet plane of the lens layer, a second lens surface group consisting of second lens surfaces which are inclined toward the opposite side from the normal direction to the sheet plane of the lens layer, and a flat portion provided between the first lens surface group and the second lens surface group in the first direction and including at least one flat surface which extends along the sheet plane of the lens layer.

4. The transmissive display device according to claim 1, wherein the lens layer of the linear Fresnel lens sheet includes a plurality of the linear Fresnel lens portions formed integrally and each having an optical center.

5. The transmissive display device according to claim 4, wherein the linear Fresnel lens portions are arranged side by side along the first direction.

6. A transmissive display device comprising: a linear Fresnel lens sheet comprising a linear Fresnel lens portion having a number of lens surfaces arranged in a first direction and a diffusion layer, a light source having a projection surface for projecting image light onto the diffusion layer of the linear Fresnel lens sheet, wherein the linear Fresnel lens portion includes a first lens surface group consisting of first lens surfaces which are inclined toward one side from a normal direction to a sheet plane of the linear Fresnel lens sheet, a second lens surface group consisting of second lens surfaces which are inclined toward the opposite side from the normal direction to the sheet plane of the linear Fresnel lens sheet, and a flat portion provided between the first lens surface group and the second lens surface group in the first direction and including at least one flat surface which extends along the sheet plane of the linear Fresnel lens sheet, and wherein the flat portion includes a plurality of flat surfaces located at different positions in said normal direction.

7. The transmissive display device according to claim 6, wherein the flat portion of the linear Fresnel lens sheet includes a plurality of flat surfaces having the same length along said sheet plane.

8. The transmissive display device according to claim 7, wherein the flat surfaces comprise a first flat surface group consisting of a plurality of first flat surfaces, and a second flat surface group consisting of a plurality of second flat surfaces and lying between the first flat surface group and the second lens surface group; a first flat surface lies in an outer position in said normal direction with respect to any other first flat surface located nearer to the first lens surface group in the first direction; and a second flat surface lies in an outer position in said normal direction with respect to any other second flat surface located nearer to the second lens surface group in the first direction.

9. The transmissive display device according to claim 6, wherein the linear Fresnel lens sheet comprises a plurality of the linear Fresnel lens portions formed integrally.

10. The transmissive display device according to claim 9, wherein the linear Fresnel lens portions are arranged side by side along the first direction.

\* \* \* \* \*